(12) United States Patent
Su et al.

(10) Patent No.: US 12,035,341 B2
(45) Date of Patent: Jul. 9, 2024

(54) COMMUNICATION METHOD, APPARATUS, AND SYSTEM

(71) Applicant: HUAWEI TECHNOLOGIES CO., LTD., Guangdong (CN)

(72) Inventors: Yuwan Su, Shenzhen (CN); Xiang Mi, Beijing (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 17/391,622

(22) Filed: Aug. 2, 2021

(65) Prior Publication Data
US 2021/0360637 A1    Nov. 18, 2021

Related U.S. Application Data

(63) Continuation of application No. PCT/CN2019/074719, filed on Feb. 3, 2019.

(51) Int. Cl.
*H04W 72/53*    (2023.01)
*H04L 5/00*    (2006.01)
(Continued)

(52) U.S. Cl.
CPC .......... *H04W 72/53* (2023.01); *H04L 5/0051* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | |
|---|---|---|
| 2015/0098369 A1 | 4/2015 | Song et al. |
| 2017/0104568 A1 | 4/2017 | Nasiri Khormuji |

(Continued)

FOREIGN PATENT DOCUMENTS

| | | |
|---|---|---|
| CN | 108282879 A | 7/2018 |
| CN | 109644169 A | 4/2019 |

(Continued)

OTHER PUBLICATIONS

Author Unknown, Enhancements to configured grant Pusch, Doc. No. R1-1810787, pp. 1-6, Oct. 8, 2018.*

(Continued)

*Primary Examiner* — Christopher M Crutchfield
(74) *Attorney, Agent, or Firm* — Fish & Richardson P.C.

(57) ABSTRACT

Example communication methods and apparatus are described. In one example method, a first cell includes a plurality of terminal devices that can transmit uplink data on a same uplink time-frequency resource. A first terminal device in the plurality of terminal devices determines a reference time domain location based on a preconfigured uplink time-frequency resource, where the reference time domain location is the same as a reference time domain location determined by another terminal device in the plurality of terminal devices. The first terminal device determines a time domain location that is (first duration×N H+second duration×(N−1)) away from the reference time domain location as a start time domain location of X gaps. The first terminal device further determines a time domain location that is (first duration×(M−1)+second duration x (M−1)) away from the reference time domain location as a start time domain location of Y first durations, where Y=X or Y=X+1. Uplink data is sent by the first terminal device to a network device on a first time-frequency resource used to transmit uplink data.

14 Claims, 18 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2017/0181182 A1 | 6/2017 | Patel et al. | |
| 2018/0368157 A1* | 12/2018 | Jeon | H04W 72/044 |
| 2019/0007969 A1 | 1/2019 | Shako | |
| 2019/0237117 A1* | 8/2019 | Polney | G11C 11/4096 |
| 2021/0176096 A1* | 6/2021 | Shimoda | H04L 25/0226 |
| 2022/0086873 A1* | 3/2022 | Wong | H04L 1/08 |

FOREIGN PATENT DOCUMENTS

| | | | |
|---|---|---|---|
| WO | 2017173881 A1 | 10/2017 | |
| WO | 2018127112 A1 | 7/2018 | |

OTHER PUBLICATIONS

Author Unknown, Enhanced SPS and grant-free transmissions, Doc. No. R1-1181274, pp. 1-8, Oct. 12, 2018.*

Author Unknown, On enhancements to configured UL grant operation, Doc. No. R1-1810553, pp. 1-6, Oct. 1, 2018.*
Extended European Search Report issued in European Application No. 19914022.9 on Dec. 1, 2021, 10 pages.
Zte, "Support for transmission in preconfigured UL resources for NB-IoT," 3GPP TSG RAN WG1 Meeting #95, R1-1812774, Spokane, USA, Nov. 12-16, 2018, 8 pages.
Office Action issued in Chinese Application No. 201980091177.8 on Jul. 11, 2022, 23 pages (with English translation).
Zte et al., "Overview of Duplexing and Interference Management," 3GPP TSG RAN WG1 Meeting#88bis, R1-1704433, Spokane, Washington, USA, Apr. 3-7, 2017, 10 pages.
3GPP TS 36.211 V15.4.0 (Dec. 2018), "3rd Generation Partnership Project; Technical Specification Group Radio Access Network; Evolved Universal Terrestrial Radio Access (E-UTRA); Physical channels and modulation (Release 15)," Dec. 2018, 240 pages.
Samsung, "Corrections on PRACH formats," 3GPP TSG RAN WG1 Meeting AdHoc#1, R1-1800417, Vancouver, Canada, Jan. 22-26, 2018, 8 pages.
PCT International Search Report and Written Opinion in International Application No. PCT/CN2019/074719, dated Oct. 12, 2019, 16 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/074719, filed on Feb. 3, 2019, the disclosure of which is hereby incorporated by reference in its entirety.

TECHNICAL FIELD

This application relates to the communications field, and in particular, to a communication method, an apparatus, and a system.

BACKGROUND

When there is uplink data for a terminal device to transmit, an existing procedure generally includes: The uplink data arrives at the terminal device; the terminal device applies for an uplink transmission resource from a network device; the network device sends uplink transmission scheduling information to the terminal device; the terminal device performs uplink transmission based on the uplink transmission scheduling information; and the network device feeds back to the terminal device, based on a demodulation status of the uplink data, whether the uplink data is successfully received.

As the Internet of Things (IoT) technology develops, IoT applications have increasingly higher requirements for IoT designs. To meet these requirements, the 3rd Generation Partnership Project (3GPP) agreed on a new research topic at the plenary meeting #62 of the Radio Access Network (RAN), to study a method for supporting a low-cost Internet of Things with very low complexity in a cellular network, and initiated a topic of a narrowband Internet of Things (NB-IoT) at the meeting RAN #69. Currently, in NB-IoT release 16, uplink (UL) grant-free transmission is being studied, and a procedure of the uplink grant-free transmission includes: Uplink data arrives at a terminal device; the terminal device directly performs uplink transmission on a preconfigured resource in a preset sending manner; and the network device feeds back, to the terminal device based on a demodulation status of the uplink data, whether the uplink data is successfully received. It can be learned that, in the uplink scheduling-free transmission, because the terminal device does not need to apply to the network device for an uplink transmission resource, and does not need to wait for the network device to send uplink transmission scheduling information to the terminal device, a procedure is streamlined. Therefore, there are advantages such as reduced power consumption, a reduced delay and reduced signaling overheads. Particularly, in the uplink scheduling-free transmission, a network device may configure different uplink scheduling-free transmission resources (dedicated resource) for different terminal devices, or may configure same or partially overlapped uplink scheduling-free transmission resources (shared resource) for different terminal devices. Compared with the dedicated resources, the shared resources help reduce network resource overheads and improve spectrum utilization.

In addition, in an NB-IoT system, due to a requirement for a low-cost terminal device, a crystal oscillator frequency offset may be generated when a terminal device equipped with a relatively low-cost crystal oscillator performs continuous uplink transmission for a long time. In this case, uplink transmission performance of the terminal device is seriously affected. Therefore, efficiency of uplink data transmission is reduced. To correct the frequency offset, an uplink gap is introduced to the conventional technology. To be specific, the terminal device inserts a 40 ms gap after each 256 ms during the uplink data transmission.

However, according to an existing uplink gap insertion mechanism, when different terminal devices in a same cell transmit uplink data on a shared resource, if start locations at which a plurality of terminal devices sends uplink data are different, even if respective reference signals (for example, demodulation reference signals (DMRS)) of the plurality of terminal devices are orthogonal before 40 ms gaps are inserted, that reference signals of the plurality of terminal devices are orthogonal after the 40 ms gaps are inserted cannot be ensured.

SUMMARY

Embodiments of this application provide a communication method, an apparatus, and a system, so that reference signals of a plurality of terminal devices are orthogonal after 40 ms gaps are inserted.

To achieve the foregoing objective, the following technical solutions are used in the embodiments of this application.

According to a first aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by the first terminal device, a reference time domain location based on a preconfigured uplink time-frequency resource, where the reference time domain location is the same as a reference time domain location determined by another terminal device in the plurality of terminal devices; determining, by the first terminal device, a time domain location that is (first duration×N+second duration×(N−1)) away from the reference time domain location as a start time domain location of X gaps, where N is 1, 2, 3, 4, ..., X, none of the X gaps is used to send uplink data, and X is a positive integer; determining, by the first terminal device, a time domain location that is (first duration×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, ..., Y, and Y=X or Y=X+1; and sending, by the first terminal device, uplink data to a network device on the first time-frequency resource. Based on this solution, a plurality of terminal devices that are in a same cell and that can transmit uplink data on a same uplink time-frequency resource correspond to a same reference time domain location, and a time domain location that is (first duration×N+second duration×(N−1)) away from the reference time domain location is a start time domain location of X gaps. Therefore, for the plurality of terminal devices that are in the same cell and that can transmit the uplink data on the same uplink time-frequency resource, even if the plurality of terminal devices send the uplink data at different start locations, that start locations and end locations of inserted gaps of the second duration are aligned may still be ensured. Further, if respective reference signals of the plurality of terminal devices are orthogonal before the gaps of the second duration are inserted, that respective reference signals of the plurality of terminal devices are orthogonal after the gaps of the second duration are inserted may also be ensured.

In a possible design, the reference time domain location is a time domain location before a start time domain location of the preconfigured uplink time-frequency resource in a periodicity of the preconfigured uplink time-frequency resource.

In a possible design, the reference time domain location is a start location of the periodicity of the preconfigured uplink time-frequency resource.

In a possible design, the start location of the periodicity of the preconfigured uplink time-frequency resource satisfies: (Subframe number corresponding to the start location) mod (Periodicity of the preconfigured uplink time-frequency resource/First specified value)=0; or (Frame number corresponding to the start location) mod (Periodicity of the preconfigured uplink time-frequency resource/Second specified value)=0, where mod( ) represents modulo, and the first specified value or the second specified value is a positive number.

In a possible design, the reference time domain location is a start time domain location of the preconfigured uplink time-frequency resource.

In a possible design, the determining, by the first terminal device, a reference time domain location based on a preconfigured uplink time-frequency resource includes: receiving, by the first terminal device, first indication information from the network device, where the first indication information is used to indicate a first offset duration of the reference time domain location relative to the start location of the periodicity of the preconfigured uplink time-frequency resource; and determining, by the first terminal device, the reference time domain location based on the first indication information and the start location of the periodicity of the preconfigured uplink time-frequency resource. Based on this solution, the first terminal device may determine the reference time domain location.

In a possible design, the determining, by the first terminal device, a reference time domain location based on a preconfigured uplink time-frequency resource includes: receiving, by the first terminal device, second indication information from the network device, where the second indication information is used to indicate a second offset duration of the start time domain location of the preconfigured uplink time-frequency resource relative to the reference time domain location; and determining, by the first terminal device, the reference time domain location based on the second indication information and the start time domain location of the preconfigured uplink time-frequency resource. Based on this solution, the first terminal device may determine the reference time domain location.

According to a second aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by a network device, a reference time domain location based on a preconfigured uplink time-frequency resource, where the reference time domain location corresponds to the plurality of terminal devices; determining, by the network device, a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer; determining, by the network device, a time domain location that is (first duration×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1; and receiving, by the network device, uplink data from the first terminal device on the first time-frequency resource. For a technical effect brought by the second aspect, refer to the technical effect brought by the first aspect. Details are not described herein again.

In a possible design, the reference time domain location is a time domain location before a start time domain location of the preconfigured uplink time-frequency resource in a periodicity of the preconfigured uplink time-frequency resource.

In a possible design, the reference tune domain location is a start location of the periodicity of the preconfigured uplink time-frequency resource.

In a possible design, the start location of the periodicity of the preconfigured uplink time-frequency resource satisfies: (Subframe number corresponding to the start location) mod (Periodicity of the preconfigured uplink time-frequency resource/First specified value)=0; or (Frame number corresponding to the start location) mod (Periodicity of the preconfigured uplink time-frequency resource/Second specified value)=0, where mod( ) represents modulo, and the first specified value or the second specified value is a positive number.

In a possible design, the reference time domain location is a start time domain location of the preconfigured uplink time-frequency resource.

In a possible design, the determining, by the network device, a reference time domain location based on a preconfigured uplink time-frequency resource includes: determining, by the network device, a first offset duration of the reference time domain location relative to the start location of the periodicity of the preconfigured uplink time-frequency resource; and determining, by the network device, the reference time domain location based on the first offset duration and the start location of the periodicity of the preconfigured uplink time-frequency resource.

In a possible design, the determining, by the network device, a reference time domain location based on a preconfigured uplink time-frequency resource includes: determining, by the network device, a second offset duration of the start time domain location of the preconfigured uplink time-frequency resource relative to the reference time domain location; and determining, by the network device, the reference time domain location based on the second offset duration and the start time domain location of the preconfigured uplink time-frequency resource.

In a possible design, the communication method according to this embodiment of this application may further include: sending, by the network device, first indication information to the first terminal device. The first indication information is used to indicate the first offset duration of the reference time domain location relative to the start location of the periodicity of the preconfigured uplink time-frequency resource.

In a possible design, the communication method according to this embodiment of this application may further include: sending, by the network device, second indication information to the first terminal device. The second indication information is used to indicate the second offset duration of the start time domain location of the preconfigured uplink time-frequency resource relative to the reference time domain location.

For technical effects brought by any design manner of the second aspect, refer to the technical effects brought by different design manners of the first aspect. Details are not described. herein again.

According to a third aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by the first terminal device, a reference time domain location, where the reference time domain location is the same as a reference time domain location determined by another terminal device in the plurality of terminal devices; determining, by the first terminal device, a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer; determining, by the first terminal device, a time domain location that is (first duration×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1; and sending, by the first terminal device, uplink data to a network device on the first time-frequency resource.

It should be noted that, the reference time domain location in this embodiment of this application may be related to a preconfigured uplink time-frequency resource, or may not be related to the preconfigured uplink time-frequency resource, and is an absolute location. A general description is provided herein.

For a technical effect brought by the third aspect, refer to the technical effect brought by the first aspect. Details are not described herein again.

According to a fourth aspect, a communication method is provided. The method is applicable to a wireless communication system. The wireless communication system includes a first cell. The first cell includes a plurality of terminal devices that can transmit uplink data on a same uplink time-frequency resource. The plurality of terminal devices include a first terminal device. The method includes: determining, by a network device, a reference time domain location, where the reference time domain location corresponds to the plurality of terminal devices; determining, by the network device, a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer; determining, by the network device, a time domain location that is (first duration ×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1; and receiving, by the network device, uplink data from the first terminal device on the first time-frequency resource.

It should be noted that, the reference time domain location in this embodiment of this application may be related to a preconfigured uplink time-frequency resource, or may not be related to the preconfigured uplink time-frequency resource, and is an absolute location. A general description is provided herein.

For a technical effect brought by the fourth aspect, refer to the technical effect brought by the first aspect. Details are not described herein again.

With reference to any one of the first aspect to the fourth aspect, in a possible design, the first duration is a positive integer multiple of 256 ms.

With reference to any one of the first aspect to the fourth aspect, in a possible design, the second duration is a positive integer multiple of 40 ms.

According to a fifth aspect, a communication apparatus is provided, to implement the foregoing methods. The communication apparatus may be the first terminal device in the first aspect or the third aspect, or an apparatus including the first terminal device. Alternatively, the communication apparatus may be the network device in the second aspect or the fourth aspect, or an apparatus including the network device. The communication apparatus includes a corresponding module, unit, or means for implementing the foregoing methods. The module, unit, or means may be implemented by hardware or software, or implemented by hardware executing corresponding software. The hardware or the software includes one or more modules or units corresponding to the foregoing function.

According to a sixth aspect, a communication apparatus is provided, including a processor and a memory. The memory is configured to store computer instructions. When the processor executes the instructions, the communication apparatus is enabled to perform the method in any one of the foregoing aspects. The communication apparatus may be the first terminal device in the first aspect or the third aspect, or an apparatus including the first terminal device. Alternatively, the communication apparatus may be the network device in the second aspect or the fourth aspect, or an apparatus including the network device.

According to a seventh aspect, a communication apparatus is provided, including a processor. The processor is coupled to a memory and is configured to read instructions in the memory, to perform the method in any one of the foregoing aspects according to the instructions. The communication apparatus may be the first terminal device in the first aspect or the third aspect, or an apparatus including the first terminal device. Alternatively, the communication apparatus may be the network device in the second aspect or the fourth aspect, or an apparatus including the network device.

According to an eighth aspect, a computer-readable storage medium is provided. The computer-readable storage medium stores instructions. When the instructions are run on a computer, the computer is enabled to perform the method according to any one of the foregoing aspects.

According to a ninth aspect, a computer program product including instructions is provided. When the computer program product is run on a computer, the computer is enabled to perform the method according to any one of the foregoing aspects.

According to a tenth aspect, a communication apparatus (where for example, the communication apparatus may be a chip or a chip system) is provided. The communication apparatus includes a processor, configured to implement the function in any one of the foregoing aspects. In a possible design, the communication apparatus further includes a memory, and the memory is configured to store necessary program instructions and necessary data. When the communication apparatus is a chip system, the communication apparatus may include a chip, or may include a chip and another discrete device.

For technical effects brought by any design manner of the fifth aspect to the tenth aspect, refer to technical effects brought by different design manners of the first aspect, the second aspect, the third aspect, or the fourth aspect. Details are not described herein again.

According to an eleventh aspect, a communication system is provided. The communication system includes the first terminal device in the foregoing aspects and the network device in the foregoing aspects.

DESCRIPTION OF EMBODIMENTS

Figure 1A:
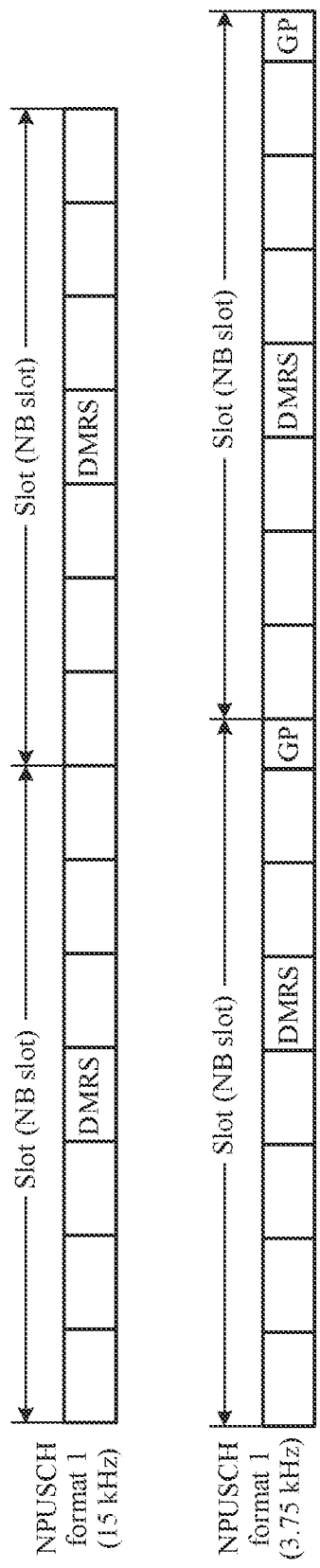
FIG. 1a is a schematic diagram of existing DMRS locations.

For ease of understanding of technical solutions in embodiments of this application, the following first briefly describes technologies or nouns related to this application.

1. IoT:

IoT is an "internet in which things are interconnected." Based on the IoT, a user end of the internet is extended to any object, so that information exchange and communication can be carried out between any objects. Such communication manner is also referred to as machine type communication (MTC). A communication node is referred to as an MTC terminal or an MTC device. Typical IoT applications include a smart grid, smart agriculture, smart transportation, smart household, environment detection, and the like.

The internet of things needs to be applied to a plurality of scenarios, for example, from outdoor to indoor, and from overground to underground. Therefore, many special requirements are imposed on a design of the internet of things. For example, an MTC terminal in some scenarios is used in an environment with poor coverage. For example, a water meter or an electric meter is usually mounted indoors, even in a basement, or other places with poor wireless network signals. Therefore, a coverage enhancement technology is required to resolve this problem. Alternatively, a quantity of MTC terminals in some scenarios is far greater than a quantity of devices for human-to-human communication, that is, large-scale deployment is required. Therefore, an MTC terminal needs to be obtained and used at very low costs. Alternatively, because a data packet transmitted by an MTC terminal in some scenarios is small, and the transmission is insensitive to a delay. Therefore, an MTC terminal with a low rate needs to be supported. Alternatively, in most cases, an MK terminal is powered by using a battery. However, in many scenarios, the MTC terminal needs to be used for more than ten ,years without replacing the battery. Therefore, the MTC terminal needs to work with very low power consumption.

To satisfy the above requirements, the mobile communications standards organization 3GPP adopted a new research project at the RAN #62 conference to study a method for supporting the IoT with very low complexity and low costs in a cellular network, and initiated an NB-IoT project at the RAN #69 conference.

2. Uplink Data Transmission:

Different from long term evolution (LTE), NB-IoT uplink data transmission supports single-tone transmission and multi-tone transmission. A quantity of subcarriers corresponding to the single-tone transmission is 1. and the single-tone transmission is mainly applicable to low-rate and coverage enhancement scenarios, and can reduce implementation costs. A quantity of subcarriers corresponding to the multi-tone transmission is greater than 1, and multi-tone transmission can provide a higher rate than the single-tone transmission, and can also support coverage enhancement. In addition, NB-IoT uplink transmission has two subcarrier spacings, namely, 15 kHz and 3.75 kHz. When a quantity of subcarriers is 1 (single-tone), the two subcarrier spacings, namely, 15 kHz and 3.75 kHz are supported. When a quantity of subcarriers is greater than 1 (multi-tone), only the subcarrier spacing, namely, 15 kHz, is supported.

A basic scheduling unit of the uplink data transmission is a resource unit (RU). When a subcarrier spacing is 3.75 kHz, an NB-IoT system supports only the single-tone transmission. One RU occupies one subcarrier in frequency domain and occupies 16 slots in time domain. When a subcarrier spacing is 15 kHz, the following RUs are defined in Table 1 ($N_{sc}^{RU}$ indicates a quantity of subcarriers occupied by one RU in frequency domain, and $N_{slots}^{UL}$ indicates a quantity of consecutive slots occupied by one RU in time domain). Each slot includes seven single-carrier frequency division multiple access (SC-FDMA) symbols.

TABLE 1

| $N_{sc}^{RU}$ | $N_{slots}^{UL}$ |
|---|---|
| 1 | 16 |
| 3 | 8 |
| 6 | 4 |
| 12 | 2 |

In addition, there may be a repetition in the uplink data transmission. One data block occupies M RUs. A quantity of repetitions is N. It indicates that uplink transmission this time occupies N*M RUs. That is, the repetitions are in a unit of M*RU.

3. DMRS:

An NB-IoT narrowband physical uplink shared channel (NPUSCH) format 1 is used to transmit uplink data. In a process of transmitting the uplink data, a terminal device simultaneously sends the DMRS. The DMRS is used by a network device to perform channel estimation and channel equalization, to correctly demodulate uplink data. As shown in FIG. 1a, when the uplink data is transmitted, one SC-FDMA symbol in one slot is used to transmit the DMRS, and six remaining SC-FDMA symbols are used to transmit the uplink data. For guard periods (GP) in FIG. 1a, refer to existing related descriptions. Details are not described herein.

As described above, there are two transmission modes for the uplink data transmission: the single-tone transmission and the multi-tone transmission. For the single-tone transmission, there are two subcarrier spacings: 3.75 kHz and 15 kHz. For the single-tone transmission, one RU occupies 16 slots regardless of the subcarrier spacing. For 3.75 kHz and 15 kHz of the single-tone transmission, DMRS generation manners are the same, and only DMRS mapping is different. For details about how to map the DMRS during uplink data transmission, refer to related descriptions in the conventional technology. This is not specifically limited in the embodiments of this application.

For example, the DMRS may be generated with reference to the following formula (1) and formula (2):

$$\bar{r}_u(n) = \frac{1}{\sqrt{2}}(1+j)(1-2c(n))w(n \bmod 16), \quad \text{Formula (1)}$$

$$0 \le n < M_{rep}^{NPUSCH} N_{slots}^{UL} N_{RU}$$

$$r_u(n) = \bar{r}_u(n) \quad \text{Formula (2)}$$

c( ) represents a Gold sequence, and in the conventional technology, c( ) is initialized at an NPUSCH transmission start location. An initialization seed is $C_{init}=35$. w( ) represents a Hadamard sequence. $r_u(n)$ represents a DMRS sequence. $M_{rep}^{NPUSCH}$ represents a quantity of repetitions of an NPUSCH. $N_{slots}^{UL}$ represents a quantity of consecutive slots occupied by one RU, and for example, may be 16. $N_{RU}$ represents a quantity of RUs occupied by one data block. mod( ) represents modulo.

The following describes a method for generating the Gold sequence.

A manner of generating the Gold sequence c(n) is shown in the following formula (3):

$$c(n)=(x_1(n+N_C)+x_2(n+N_C)) \bmod 2 \quad \text{Formula (3)}$$

where a length of Gold is denoted as $M_{PN}$, that is, a value range of n is 0, 1, ..., $M_{PN}-1$, $x_1(n+N_C)$ and $x_2(n+N_C)$ are two sequences for generating c(n), $N_C=1600$, and mod( ) represents modulo.

The foregoing sequence $x_1(n+N_C)$ may be determined by using the following formula (4):

$$x_1(n+31)=(x_1(n+3)+x_1(n)) \bmod 2 \quad \text{Formula (4)}$$

An initialization seed of the sequence $x_1(n+N_C)$ is $x_1(0)=1$, $x_1(n)=0$, n=1, 2, ... 30.

The foregoing sequence $x_2(n+N_C)$ may be determined by using the following formula (5):

$$x_2(n+31)=(x_2(n+3)+x_2(n+2)+x_2(n+1)+x_2(n)) \bmod 2 \quad \text{Formula (5)}$$

Optionally, a value of an initialization seed of the sequence $x_2(n+N_C)$ is related to specific application. During generation of the DMRS sequence, the initialization seed of the sequence $x_2(n+N_C)$ is 35. The sequence $x_2(n+N_C)$ may be obtained by using a formula $c_{init}=\Sigma_{i=0}^{30} x_2(i) \cdot 2^1$ and $C_{init}=35$.

The Hadamard sequence w( ) of a length that is 16 is shown in Table 2.

TABLE 2

| u | w(0), ... , w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | -1 | 1 | -1 | 1 | -1 | 1 | -1 | 1 | -1 | 1 | -1 | 1 | -1 | 1 | -1 |
| 2 | 1 | 1 | -1 | -1 | 1 | 1 | -1 | -1 | 1 | 1 | -1 | -1 | 1 | 1 | -1 | -1 |
| 3 | 1 | -1 | -1 | 1 | 1 | -1 | -1 | 1 | 1 | -1 | -1 | 1 | 1 | -1 | -1 | 1 |
| 4 | 1 | 1 | 1 | 1 | -1 | -1 | -1 | -1 | 1 | 1 | 1 | 1 | -1 | -1 | -1 | -1 |
| 5 | 1 | -1 | 1 | -1 | -1 | 1 | -1 | 1 | 1 | -1 | 1 | -1 | -1 | 1 | -1 | 1 |
| 6 | 1 | 1 | -1 | -1 | -1 | -1 | 1 | 1 | 1 | 1 | -1 | -1 | -1 | -1 | 1 | 1 |
| 7 | 1 | -1 | -1 | 1 | -1 | 1 | 1 | -1 | 1 | -1 | -1 | 1 | -1 | 1 | 1 | -1 |
| 8 | 1 | 1 | 1 | 1 | 1 | 1 | 1 | 1 | -1 | -1 | -1 | -1 | -1 | -1 | -1 | -1 |
| 9 | 1 | -1 | 1 | -1 | 1 | -1 | 1 | -1 | -1 | 1 | -1 | 1 | -1 | 1 | -1 | 1 |
| 10 | 1 | 1 | -1 | -1 | 1 | 1 | -1 | -1 | -1 | -1 | 1 | 1 | -1 | -1 | 1 | 1 |

TABLE 2-continued

| u | w(0), . . . , w(15) |
|---|---|
| 11 | 1  -1  -1   1   1  -1  -1   1  -1   1   1  -1  -1   1   1  -1 |
| 12 | 1   1   1   1  -1  -1  -1  -1  -1  -1  -1  -1   1   1   1   1 |
| 13 | 1  -1   1  -1  -1   1  -1   1  -1   1  -1   1   1  -1   1  -1 |
| 14 | 1   1  -1  -1  -1  -1   1   1  -1  -1   1   1   1   1  -1  -1 |
| 15 | 1  -1  -1   1  -1   1   1  -1  -1   1   1  -1   1  -1  -1   1 |

In Table 2, u is an index of a Hadamard sequence w( ). Hadamard sequences corresponding to different indexes of the Hadamard sequences w( ) are orthogonal to each other. For the single-tone transmission, one RU occupies 16 slots regardless of a subcarrier spacing. The 16 slots may correspond to one Hadamard sequence w( ) of the length that is 16. If different terminal devices in a same cell transmit uplink data on a shared resource, when RU boundaries of different terminal devices cannot be aligned, even if different terminal devices correspond to different Hadamard sequence indexes u, Hadamard sequences used by different terminal devices on a same time-frequency resource are not orthogonal. When RU boundaries of different terminal devices are aligned, and different terminal devices correspond to different Hadamard sequence indexes u, Hadamard sequences used by different terminal devices on a same time-frequency resource are orthogonal.

In the conventional technology, a calculation formula of an index u of a Hadamard sequence w( ) in a group hopping scenario is different from a calculation formula of an index u of a Hadamard sequence w( ) in a non-group hopping scenario.

The calculation formula of the index u of the Hadamard sequence w( ) in the non-group hopping scenario is the following formula (6):

$$u = N_{ID}^{Ncell} \bmod 16 \qquad \text{Formula (6)}$$

where $N_{ID}^{Ncell}$ represents a cell identifier, and mod( ) represents modulo.

According to the foregoing formula (6), for example, one data block occupies two RUs, the NPUSCH is repeated twice, and there are four RUs in total. In this case, a mapping relationship between the cell identifier and indexes u of Hadamard sequences used by the RUs may be shown in Table 3. It can be learned from Table 3 that in this case, indexes u of Hadamard sequences used on all RUs are the same. Intra-frequency cells, such as cell 0 and cell 16, use the same index u of Hadamard sequences.

TABLE 3

| Cell ID. | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 0 | 0 | 0 | 0 |
| 1 | 1 | 1 | 1 | 1 |
| 2 | 2 | 2 | 2 | 2 |
| . . . | . . . | . . . | . . . | . . . |
| 13 | 13 | 13 | 13 | 13 |
| 14 | 14 | 14 | 14 | 14 |
| 15 | 15 | 15 | 15 | 15 |
| 16 | 16 | 16 | 16 | 16 |
| 17 | 17 | 17 | 17 | 17 |
| . . . | . . . | . . . | . . . | . . . |

The calculation formula of the index u of the Hadamard sequence w( ) in the group hopping scenario is the following formula (7):

$$u = (f_{gh}(n_s) + f_{SS}) \bmod N_{seq}^{RU} \qquad \text{Formula (7)}$$

$f_{gh}(n_s)$ represents a group hopping pattern. $f_{SS}$ represents a sequence shift pattern. mod represents modulo. $N_{seq}^{RU}$ represents a length of one RU, for example, may be 16.

A calculation formula of $f_{gh}(n_S)$ is the following formula (8):

$$f_{gh}(n_S) = (\Sigma_{i=0}^{7} c(8n'_S + i) \cdot 2^i) \bmod N_{seq}^{RU} \qquad \text{Formula (8)}$$

c( ) represents a Gold sequence. In the conventional technology, initialization of c( ) is performed at a start location of each RU, and the initialization seed is $$C_{init} = \left\lfloor \frac{N_{ID}^{Ncell}}{N_{seq}^{RU}} \right\rfloor \cdot \lfloor \rfloor$$

represents rounding down $N_{ID}^{Ncell}$ represents a cell identifier. $N_{seq}^{RU}$ represents a length of one RU, for example, may be 16. For a single tone, $R_S^1$ is the first slot number of each RU. mod represents modulo. $N_{seq}^{RU}$ represents a length of one RU, for example, may be 16.

A calculation formula of $f_{SS}$ is the following formula (9):

$$f_{SS} = (N_{ID}^{Ncell} + \Delta_{SS}) \bmod N_{seq}^{RU} \qquad \text{Formula (9)}$$

$N_{ID}^{Ncell}$ represents the cell identifier. mod( ) represents modulo. $N_{seq}^{RU}$ represents the length of the RU, and for example, may be 16. $\Delta_{SS} \in \{0,1, \ldots, 29\}$ is a parameter configured by a higher layer. If this parameter is not configured, a default value is 0.

According to the foregoing formula (7) to formula (9), for example, one data block occupies two RUs, the NPUSCH is repeated twice, and there are four RUs in total. In this case, the index u of the Hadamard sequence may be determined by using $f_{gh}(n_S)$ and $f_{SS}$. A mapping relationship between the cell identifier and indexes u of Hadamard sequences used by the RUs may be shown in Table 4. It can be learned from Table 4 that in this case, indexes u of Hadamard sequences used on all RUs are different. Intra-frequency cells, such as cell 0 and cell 16, use different indexes u of Hadamard sequences.

TABLE 4

| Cell ID. | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 1 | 5 | 7 | 9 |
| 1 | 2 | 6 | 8 | 10 |
| 2 | 3 | 7 | 9 | 11 |
| . . . | . . . | . . . | . . . | . . . |
| 13 | 14 | 2 | 4 | 6 |

TABLE 4-continued

| Cell ID. | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 14 | 15 | 3 | 5 | 7 |
| 15 | 0 | 4 | 6 | 8 |
| 16 | 2 | 9 | 3 | 5 |
| 17 | 3 | 10 | 4 | 6 |
| ... | ... | ... | ... | ... |

It should be noted that, a value of the index u of the Hadamard sequence in Table 4 is merely an example. An example where when $C_{init}=0$, $f_{gh}(n_S)=1, 5, 7$, and 9, and an example where when $C_{init}=1$, $f_{gh}(n_S)=2, 9, 3$, and 5 are used for description. When $f_{gh}(n_S)$ is another value, the values of the indexes u of the Hadamard sequences may be different from those in Table 4. This is not specifically limited in this embodiment of this application.

The following describes technical solutions in the embodiments of this application with reference to accompanying drawings in the embodiments of this application. In descriptions of this application, "/" represents an "or" relationship between associated objects unless otherwise specified. For example, A/B may represent A or B. The term "and/or" in this application describes only an association relationship between associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items with basically same functions or purposes. A person skilled in the art may understand that the terms such as "first" and "second" do not limit a quantity or an execution sequence, and the terms such as "first" and "second" do not indicate a definite difference. In addition, in the embodiments of this application, a word such as "example" or "for example" is used to represent giving an example, an illustration, or a description. Any embodiment or design scheme described as an "example" or "for example" in the embodiments of this application should not be explained as being preferable or having more advantages than another embodiment or design scheme. Exactly, use of the word such as "example" or "for example" is intended to present a relative concept in a specific manner for ease of understanding.

The embodiments of this application are applicable to an LTE system, for example, an NB-IoT system, or are applicable to another wireless communication system, for example, a global system for mobile communication (GSM), a universal mobile telecommunications system (UMTS), a code division multiple access (CDMA) system, a wideband code division multiple access (WCDMA) system, and a future-oriented new network device system. This is not specifically limited in the embodiments of this application. The foregoing communication systems applicable to this application are merely examples for description, and communication systems applicable to this application are not limited thereto. A general description is provided herein. Details are not described below again. In addition, the terms "system" and "network" may be interchanged.

It can be learned from the foregoing formula (1) and the foregoing formula (2) that, when different terminal devices in a same cell transmit uplink data on a shared resource, if Hadamard sequences corresponding to the different terminal devices are orthogonal and Gold sequences are the same, that reference signals of the different terminal devices are orthogonal can be ensured. In the conventional technology, 256 ms after duration of uplink data transmission and/or duration delayed due to a collision between the uplink data and a random access channel, a 40 ms gap is inserted for delaying uplink data transmission. In this way, when different terminal devices in a same cell transmit uplink data on a shared resource, if start locations at which a plurality of terminal devices sends uplink data are different, even if respective reference signals (for example, DMRSs) of the plurality of terminal devices are orthogonal before 40 ms gaps are inserted, that reference signals of the plurality of terminal devices are orthogonal after the 40 ms gaps are inserted cannot be ensured.

Figure 1B:
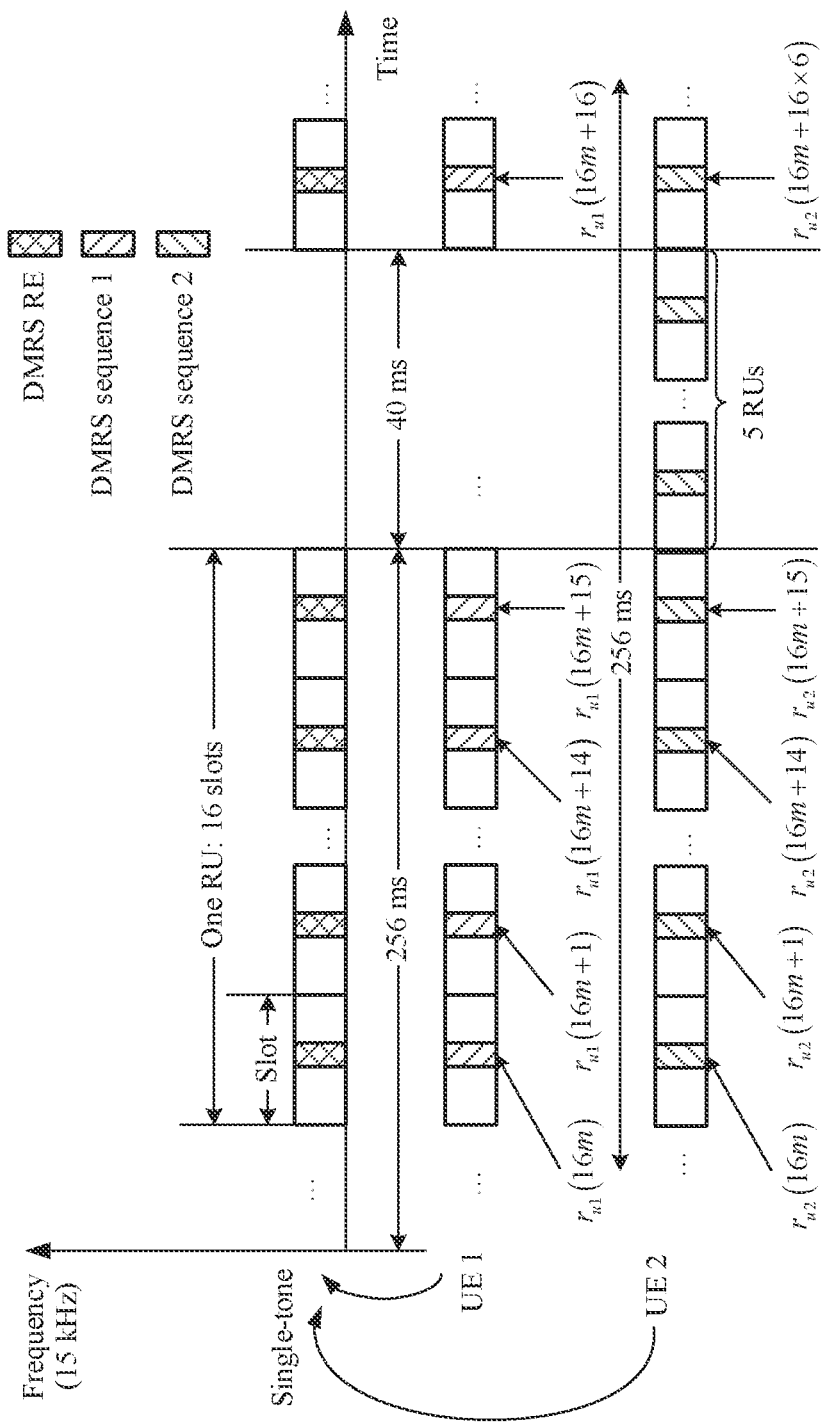
FIG. 1b is a schematic diagram of current data transmission of different terminal devices when a subcarrier spacing is 15 kHz.

For example, an example in which a subcarrier spacing of a shared resource is 15 kHz and one RU=8 ms is used. As shown in FIG. 1b, it is assumed that when UE 1 and UE 2 in a same cell transmit uplink data on the shared resource, a start location at which the UE 1 sends uplink data is different from a start location at which the UE 2 sends uplink data. Before the UE 1 inserts a 40 ms (corresponding to five RUs) gap, Hadamard sequences corresponding to the UE 1 and the UE 2 are orthogonal. Gold sequences corresponding to UE 1 and UE 2 are the same. Therefore, a DMRS corresponding to the UE 1 and a DMRS corresponding to the UE 2 are orthogonal. In the first slot after the UE 1 inserts the 40 ms gap, a value of n in the formula (1) and formula (2) for generating the DMRS corresponding to the UE 1 is 16m+16. A value of n in the formula (1) and formula (2) for generating the DMRS corresponding to the UE 2 is 16m+16×6, and m is a positive integer. It can be learned from the descriptions of the Hadamard sequence and the Gold sequence that, in this case, RU boundaries are aligned. On a same time-frequency resource, a Hadamard sequence corresponding to the UE 1 and a Hadamard sequence corresponding to the UE 2 are orthogonal, but a Gold sequence corresponding to the UE 1 and a Gold sequence corresponding to the UE 2 are different. Therefore, that after the UE 1 inserts the 40 ms gap, a DMRS corresponding to the UE 1 and a DMRS corresponding to the UE 2 are orthogonal cannot be ensured.

Figure 1C:
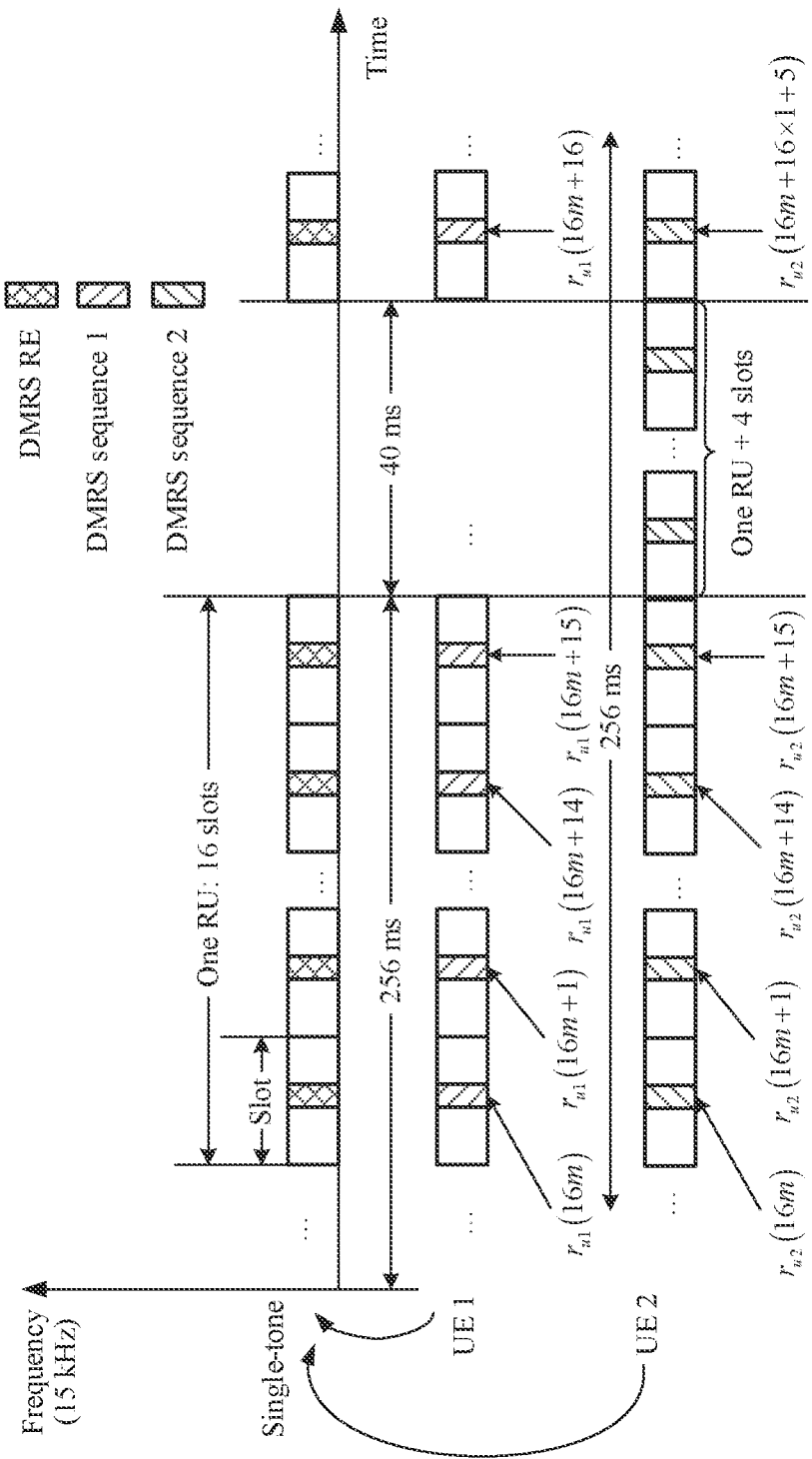
FIG. 1c is a schematic diagram of current data transmission of different terminal devices when a subcarrier spacing is 3.75 kHz.

Alternatively, for example, an example in which a subcarrier spacing of a shared resource is 3.75 kHz and one RU=32 ms is used. As shown in FIG. 1c, it is assumed that when UE 1 and UE 2 in a same cell transmit uplink data on the shared resource, a start location at which the UE 1 sends uplink data is different from a start location at which the UE 2 sends uplink data. Before the UE 1 inserts a 40 ms gap (corresponding to one RU and four slots), Hadamard sequences corresponding to the UE 1 and the UE 2 are orthogonal. Gold sequences corresponding to UE 1 and UE 2 are the same. Therefore, a DMRS corresponding to the UE 1 and a DMRS corresponding to the UTE 2 are orthogonal. In the first slot after the UE 1 inserts the 40 ms gap, a value of n in the formula (1) and formula (2) for generating the DMRS corresponding to the UE 1 is 16m+16. A value of n in the formula (1) and formula (2) for generating the DMRS corresponding to the UE 2 is 16 m+16×1+5, and m is a positive integer. It can be learned from the descriptions of the Hadamard sequence and the Gold sequence that, in this case, RU boundaries are not aligned. On a same time-frequency resource, a Hadamard sequence corresponding to the UE 1 and a Hadamard sequence corresponding to the UE 2 are not orthogonal, and a Gold sequence corresponding to the UE 1 and a Gold sequence corresponding to the UE 2 are different. Therefore, that after the UE 1 inserts the 40 ms gap, a DMRS corresponding to the UE 1 and a DMRS corresponding to the UE 2 are orthogonal cannot be ensured.

Figure 2:
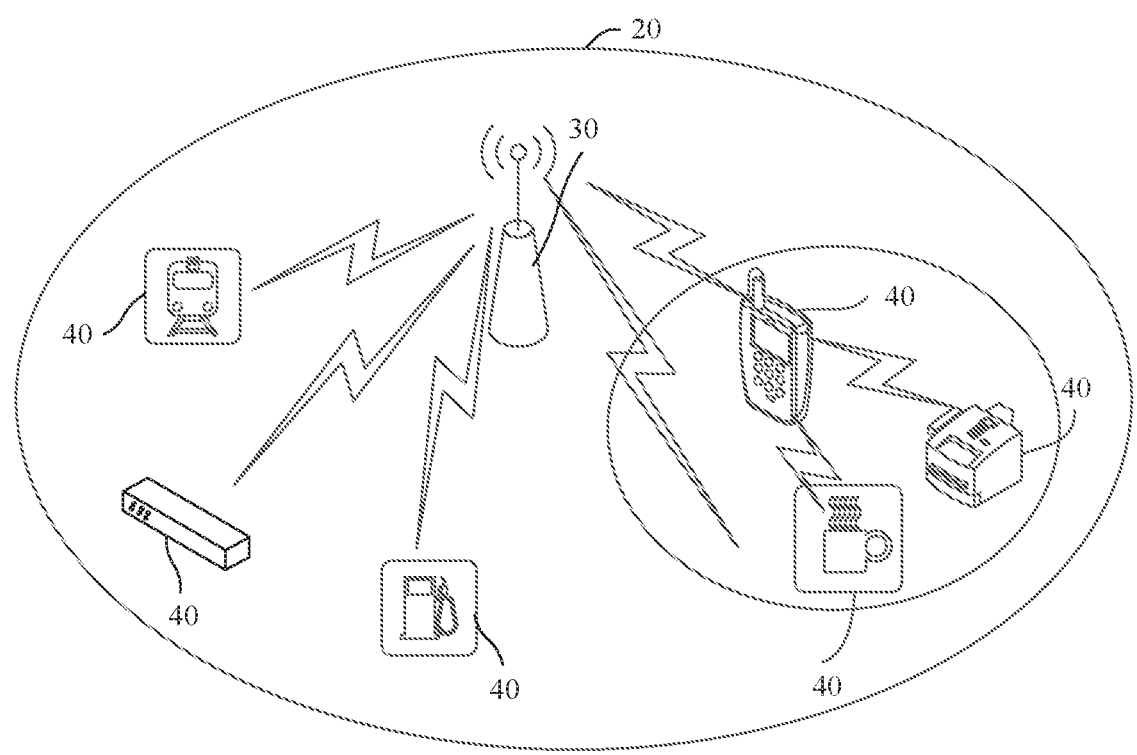
FIG. 2 is a schematic structural diagram of a communication system according to an embodiment of this application.

Based on this, FIG. 2 shows a communication system 20 according to an embodiment of this application. The communication system 20 includes a network device 30 and a plurality of terminal devices 40 in a first cell covered by the network device 30. The plurality of terminal devices 40 can transmit uplink data on a same uplink time-frequency resource. Optionally, different terminal devices in the plurality of terminal devices 40 may communicate with each other. The first cell may be any one of one or more cells covered by the network device 30.

For example, the plurality of terminal devices 40 include a first terminal device, and the first terminal device is any one of the plurality of terminal devices 40. In this embodiment of this application, the first terminal device determines a reference time domain location based on a preconfigured uplink time-frequency resource, where the reference time domain location is the same as a reference time domain location determined by another terminal device in the plurality of terminal devices. The first terminal device determines a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer. The first terminal device determines a time domain location that is (first duration×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y and Y=X or Y=X+1. The first terminal device sends the uplink data to the network device 30 on the first time-frequency resource. Correspondingly, the network device 30 determines the reference time domain location based on the preconfigured uplink time-frequency resource. The network device 30 determines the time domain location that is (first duration×N+second duration×(N−1)) away from the reference time domain location as the start time domain location of the X gaps. The network device 30 determines the time domain location that is (first duration×(M−1)+second duration×(M−1)) away from the reference time domain location as the start time domain location of the Y first durations. The network device 30 receives the uplink data from the first terminal device on the first time-frequency resource. Based on this solution, a plurality of terminal devices that are in a same cell and that can transmit uplink data on a same uplink time-frequency resource correspond to a same reference time domain location, and a time domain location that is (first duration×N+second duration×(N−1)) away from the reference time domain location is a start time domain location of X gaps. Therefore, for the plurality of terminal devices that are in the same cell and that can transmit the uplink data on the same uplink time-frequency resource, even if the plurality of terminal devices send the uplink data at different start locations, that start locations and end locations of inserted gaps of the second duration are aligned may still be ensured. Further, if respective reference signals of the plurality of terminal devices are orthogonal before the gaps of the second duration are inserted, that respective reference signals of the plurality of terminal devices are orthogonal after the gaps of the second duration are inserted may also be ensured.

It should be noted that "*" and "×" in the embodiments of this application have the same meaning, and both represent multiplication. Details are not described herein again.

It should be noted that the embodiments of this application are intended to resolve a problem of how to ensure that reference signals of a plurality of terminal devices are orthogonal after gaps of the second duration are inserted if reference signals (for example, DMRSs) of the plurality of terminal devices are orthogonal before the gaps of the second duration are inserted. How to ensure that the reference signals of the plurality of terminal devices are orthogonal before the gaps of the second duration are inserted is not specifically limited in the embodiments of this application. For example, any terminal device in the plurality of terminal devices may determine a gap based on the reference time domain location and a start time domain location of reference signal transmission. Further, a reference signal is generated based on the gap. In this way, that the reference signals of the plurality of terminal devices are orthogonal before the gaps of the second duration are inserted can be ensured. A general description is provided herein, and details are not described below.

Optionally, the network device 30 in this embodiment of this application is a device for connecting the terminal devices 40 to a wireless network, and may be an evolved NodeB (evolutional Node B, eNB, or eNodeB) in long term evolution (LTE), a base transceiver station (BTS) in GSM or CDMA, a NodeB in a WCDMA system, a base station in a fifth generation (5G) network or a future evolved public land mobile network (PLMN), a broadband network gateway (BNG), an aggregation switch, a non-third generation partnership project (3GPP) access device, or the like. This is not specifically limited in this embodiment of this application. Optionally, the base station in the embodiments of this application may include base stations in various forms, for example, a macro base station, a micro base station (which is also referred to as a small cell), a relay station, and an access point. This is not specifically limited in the embodiments of this application.

Optionally, the terminal device 40 in the embodiments of this application may be a device such as a terminal or a chip that may be used in the terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or in a fixed location, Optionally, the network device 30 and the terminal device 40 in this embodiment of this application may also be referred to as communication apparatuses, and each may be a general-purpose device or a dedicated device. This is not specifically limited in this embodiment of this application.

Figure 3:
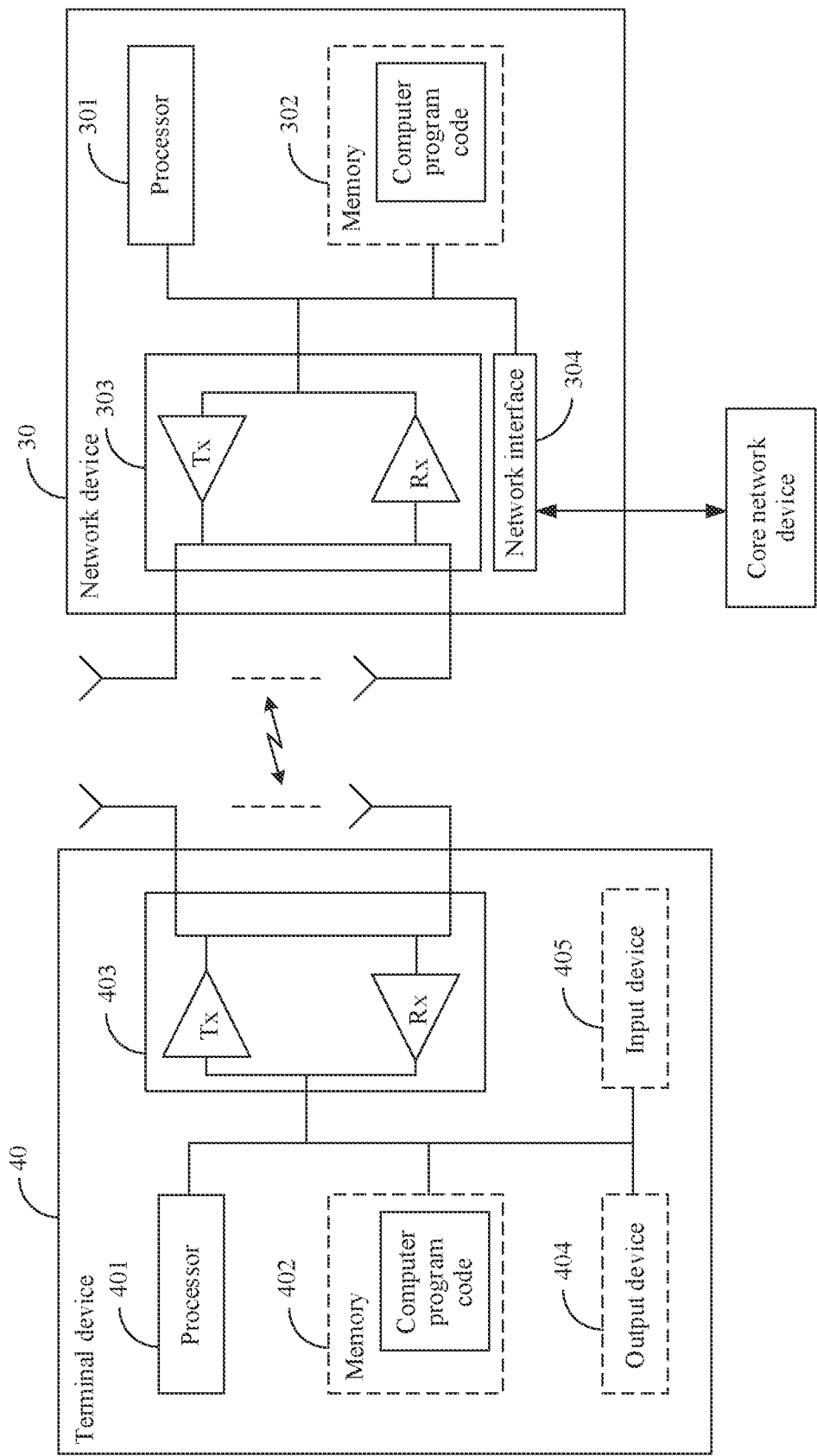
FIG. 3 is a schematic structural diagram of a terminal device and a network device according to an embodiment of this application.

Optionally, FIG. 3 is a schematic structural diagram of a network device 30 and a terminal device 40 according to an embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). Optionally, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected through a communication line. The communication line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. In a specific implementation, in an embodiment, the processor 401 may also include a plurality of CPUs, and the processor 401 may be a single-core single-CPU) processor or a multi-core (multi-CPU) processor. The processor herein may refer to one or more devices, circuits, and/or processing cores configured to process data (for example, computer program instructions).

The memory 402 may be an apparatus having a storage function. For example, the memory 402 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a blu-ray optical disc, or the like), a magnetic disk storage medium or another magnetic storage device, or any other computer-accessible medium that can be used to carry or store desired program code in instructions or data structure form, but is not limited thereto. The memory 402 may exist independently and is connected to the processor 401 through the communication line. Alternatively, the memory 402 may be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the communication method in the embodiments of this application.

Alternatively, optionally, in this embodiment of this application, the processor 401 may perform processing related functions in the communication method according to the following embodiments of this application, and the transceiver 403 is responsible for communication with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network such as an Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). Optionally, the network device 30 may further include at least one memory (an example in which the network device 30 includes one memory 302 is used for description in FIG. 3). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 4:
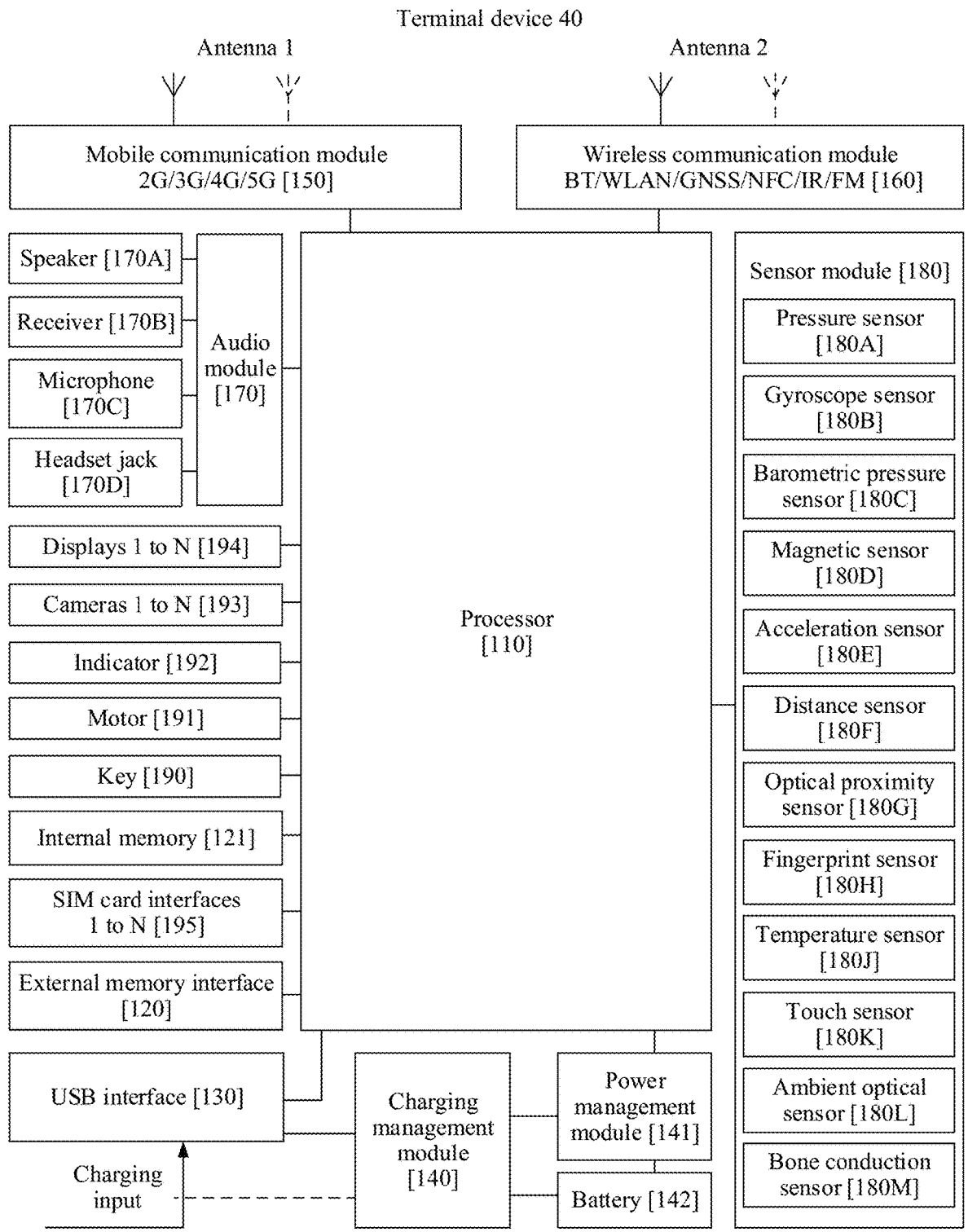
FIG. 4 is another schematic structural diagram of a terminal device according to an embodiment of this application.

With reference to the schematic structural diagram of the terminal device 40 shown in FIG. 3, for example, FIG. 4 is a specific structural form of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution used for wireless communication including 2G, 3G, 4G, 5G, and the like in the terminal device 40. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit an electromagnetic wave obtained after processing to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some of function modules in the mobile communication module 150 may be disposed in a same component as at least some of modules in the processor 110.

The wireless communication module 160 may provide a solution used for wireless communication including a wireless local area network (WLAN) (for example, a Wi-Fi network), Bluetooth (BT), a global navigational satellite system (GNSS), frequency modulation (FM), near field communication (NFC), an infrared (IR) technology, and the like in the terminal device 40. The wireless communication module 160 may be one or more devices that integrate at least one communication processing module. The wireless communication module 160 receives an electromagnetic wave by using the antenna 2, performs frequency modulation and filtering processing on the electromagnetic wave signal, and sends a signal obtained after processing to the processor 110. The wireless communication module 160 may further receive a to-be-sent signal from the processor 110, perform frequency modulation and amplification on the signal, and convert the signal into an electromagnetic wave for radiation by using the antenna 2. When the terminal device 40 is a first device, that the wireless communication module 160 may provide a solution used for NFC wireless communication on the terminal device 40 means that the first device includes an NFC chip. The NFC chip can improve an NFC wireless communication function. When the terminal device 40 is a second device, that the wireless communication module 160 may provide a solution used for NFC wireless communication on the terminal device 40 means that the first device includes an electronic label (such as a radio frequency identification (RFID) label). An NFC chip, near the electronic label, of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communications technology. The wireless communications technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), and a satellite based augmentation system (SBAS).

In some embodiments, a function of the memory 402 in FIG. 3 may be implemented by using an internal memory 121, an external memory (for example, a Micro SD card) connected to an external memory interface 120 in FIG. 4, or the like.

In some embodiments, a function of the output device 404 in FIG. 3 may be implemented by using a display 194 in FIG. 4. The display 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C, a headset jack 170D, or the like. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by hardware, software, or a combination of software and hardware.

With reference to FIG. 2 to FIG. 4, the following describes, by using an example in which the first terminal device in the plurality of terminal devices 40 and the network device shown in FIG. 2 interact with each other, the communication method according to the embodiments of this application.

It should be noted that in the following embodiments of this application, names of messages between network elements, names of parameters in messages, or the like are merely examples, and may be other names in a specific implementation. This is not specifically limited in the embodiments of this application.

Figure 5:
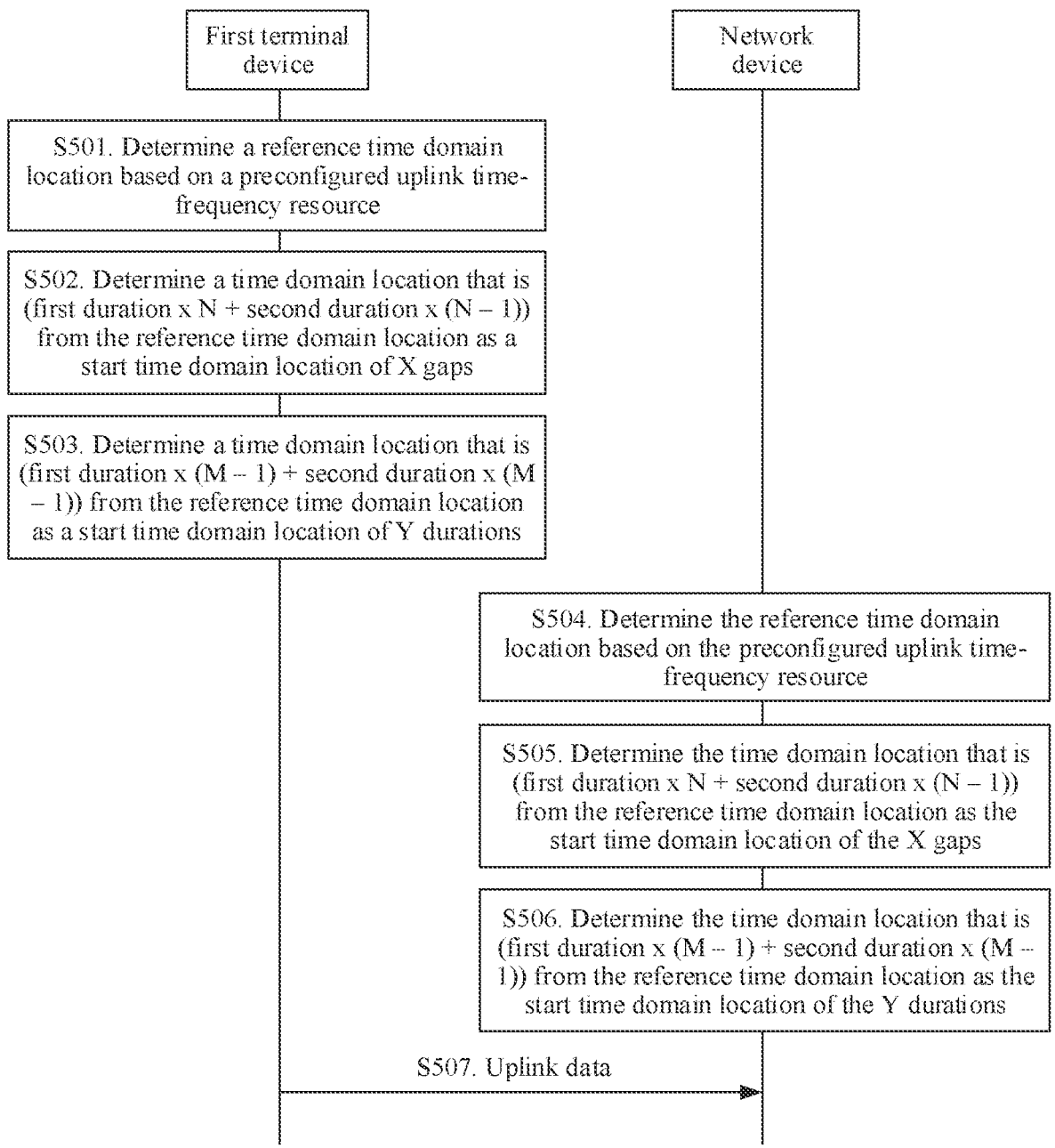
FIG. 5 shows a communication method according to an embodiment of this application.

FIG. 5 shows a communication method according to an embodiment of this application. The communication method includes the following steps.

A first terminal device determines a reference time domain location based on a preconfigured uplink time-frequency resource, where the reference time domain location is the same as a reference time domain location determined by another terminal device in a plurality of terminal devices.

In other words, in this embodiment of this application, a plurality of terminal devices that can transmit uplink data on a same uplink time-frequency resource correspond to a same reference time domain location.

In a possible implementation, in this embodiment of this application, the reference time domain location is a time domain location before a start time domain location of the preconfigured uplink time-frequency resource in a periodicity of the preconfigured uplink time-frequency resource.

Figure 6:
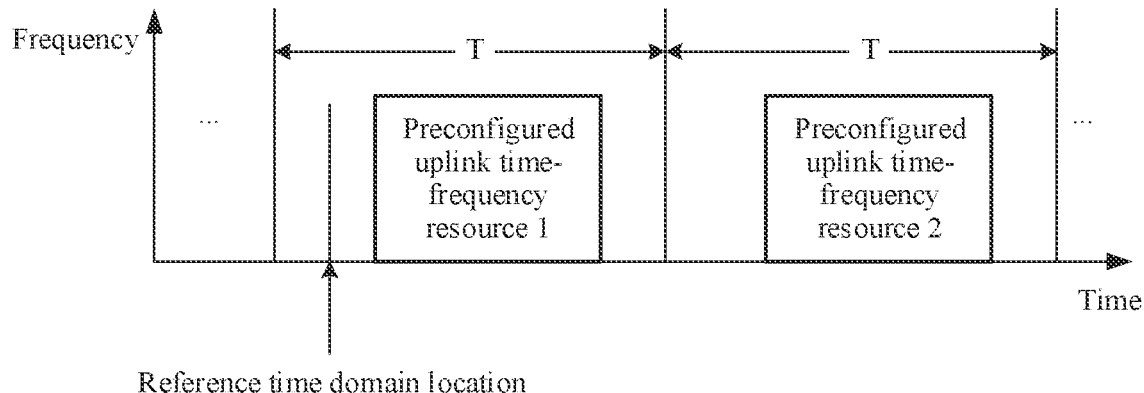
FIG. 6 is a schematic diagram 1 of a reference time domain location according to an embodiment of this application.

For example, as shown in FIG. 6, assuming that the preconfigured uplink time-frequency resource is an uplink time-frequency resource 1, the reference time domain location may be a location between a start time domain location of the preconfigured uplink time-frequency resource 1 and a start location of a periodicity of the preconfigured uplink time-frequency resource 1 in the periodicity of the preconfigured uplink time-frequency resource 1.

Figure 7:
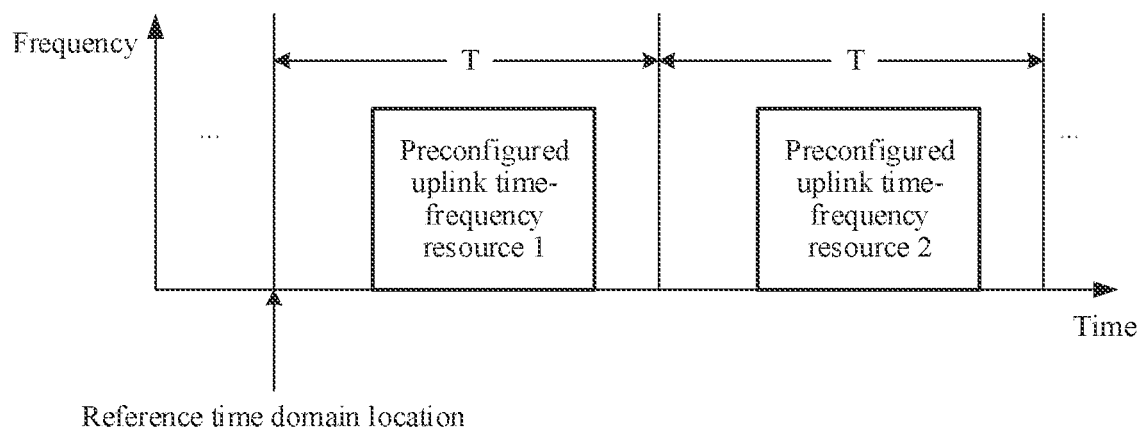
FIG. 7 is a schematic diagram 2 of a reference time domain location according, to an embodiment of this application.

Alternatively, for example, as shown in FIG. 7, assuming that the preconfigured uplink time-frequency resource is an uplink time-frequency resource 1, the reference time domain location may be a start location of the periodicity of the preconfigured uplink time-frequency resource.

Figure 8:
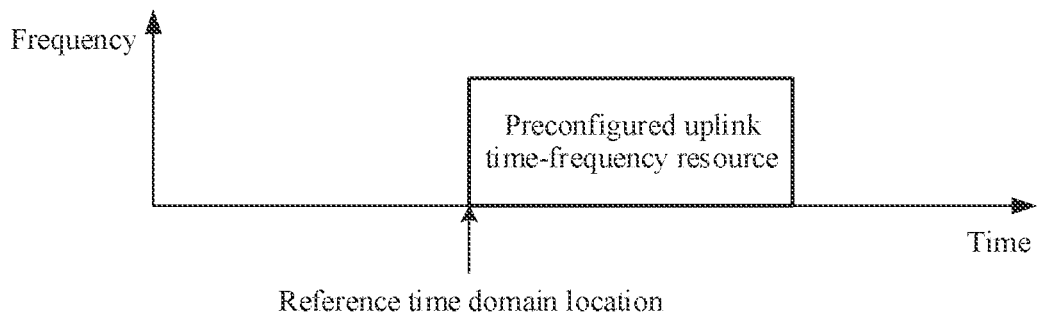
FIG. 8 is a schematic diagram 3 of a reference time domain location according to an embodiment of this application.

In another possible implementation, in this embodiment of this application, the reference time domain location is a start time domain location of the preconfigured uplink time-frequency resource, as shown in FIG. 8.

Optionally, the preconfigured uplink time-frequency resource herein may be periodic, or may be aperiodic. This is not specifically limited herein.

For the foregoing two possible implementations:

Optionally, that a first terminal device determines a reference time domain location based on a preconfigured uplink time-frequency resource may include: receiving, by the first terminal device, first indication information from a network device, where the first indication information is used to indicate a first offset duration of the reference time domain location relative to the start location of the periodicity of the preconfigured uplink time-frequency resource; and determining, by the first terminal device, the reference time domain location based on the first indication information and the start location of the periodicity of the preconfigured uplink time-frequency resource.

Figure 9:
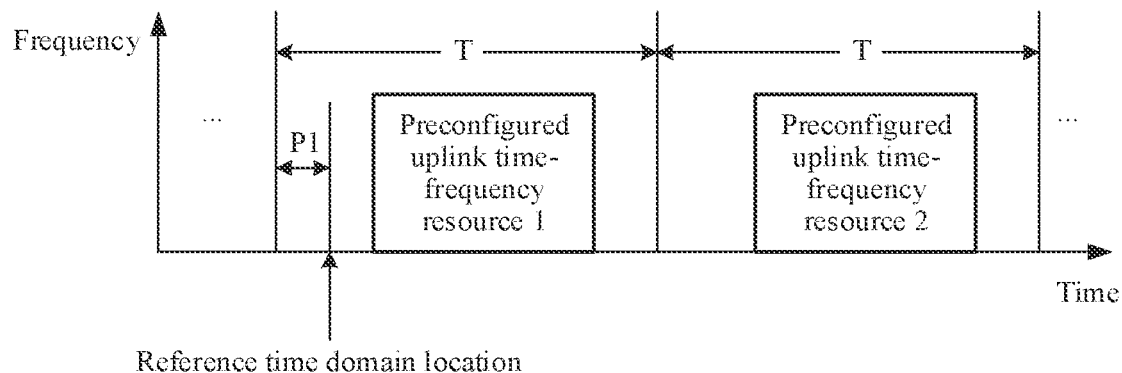
FIG. 9 is a schematic diagram of a first offset duration according to an embodiment of this application.

For example, a description is provided with reference to FIG. 6. The first indication information may be used to indicate a first offset duration P1 of the reference time domain location relative to the start location of the periodicity of the preconfigured uplink time-frequency resource 1. Further, the first terminal device may determine the reference time domain location based on the first indication information and the start location of the periodicity of the preconfigured uplink time-frequency resource 1, as shown in FIG. 9.

Alternatively, optionally, that a first terminal device determines a reference time domain location based on a preconfigured uplink time-frequency resource may include: receiving, by the first terminal device, second indication information from the network device, where the second indication information is used to indicate a second offset duration of the start time domain location of the preconfigured uplink time-frequency resource relative to the reference time domain location; and determining, by the first terminal device, the reference time domain location based on the second indication information and the start time domain location of the preconfigured uplink time-frequency resource.

Figure 10:
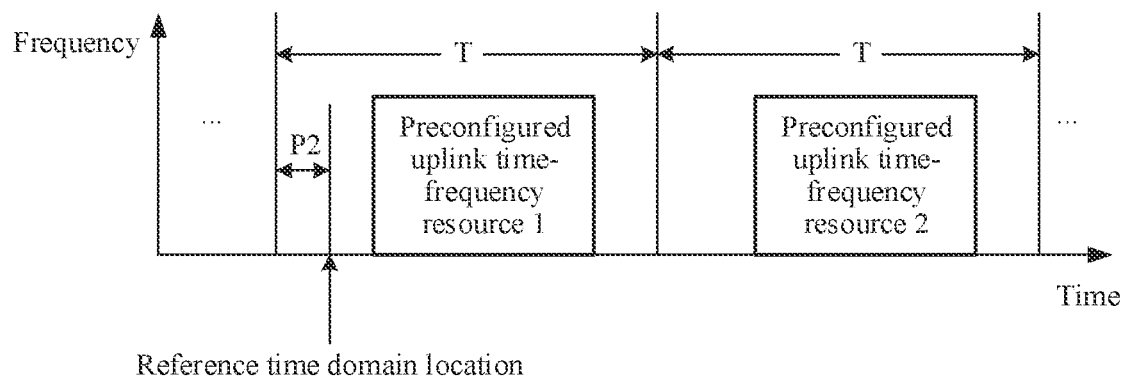
FIG. 10 is a schematic diagram of a second offset duration according to an embodiment of this application.

For example, a description is provided with reference to FIG. 7. The second indication information may be used to indicate a second offset duration P2 of the start time domain location of the preconfigured uplink time-frequency resource 1 relative to the reference time domain location. Further, the first terminal device may determine the reference time domain location based on the second indication information and a start time domain location of a preconfigured uplink time-frequency resource 2, as shown in FIG. 10.

In still another possible implementation, if the preconfigured uplink time-frequency resource is a periodic resource, every N preconfigured uplink resources may correspond to one reference time domain location. The reference time domain location is a time domain location before a start time domain location of the first preconfigured uplink time-frequency resource in a periodicity of the first preconfigured uplink time-frequency resource in the every N preconfigured uplink time-frequency resources. N is a positive integer greater than 1.

Optionally, in this implementation, the terminal device may alternatively determine the reference time domain location based on indication information sent by the network device. The indication information is used to indicate a third offset duration of each reference time domain location relative to a start location of the periodicity of the first preconfigured uplink time-frequency resource in the every N preconfigured uplink time-frequency resources. Alternatively, the indication information is used to indicate a fourth offset duration of a start location of the first preconfigured uplink time-frequency resource in the every N preconfigured uplink time-frequency resources relative to each reference time domain location. For a related example, refer to FIG. 9 or FIG. 10. Details are not described herein again.

In still another possible implementation, if the preconfigured uplink time-frequency resource is a periodic resource, every N preconfigured uplink resources may correspond to one reference time domain location. The reference time domain location is a start location of the first preconfigured uplink time-frequency resource in the every N preconfigured uplink time-frequency resources. N is a positive integer greater than 1.

Figure 11:
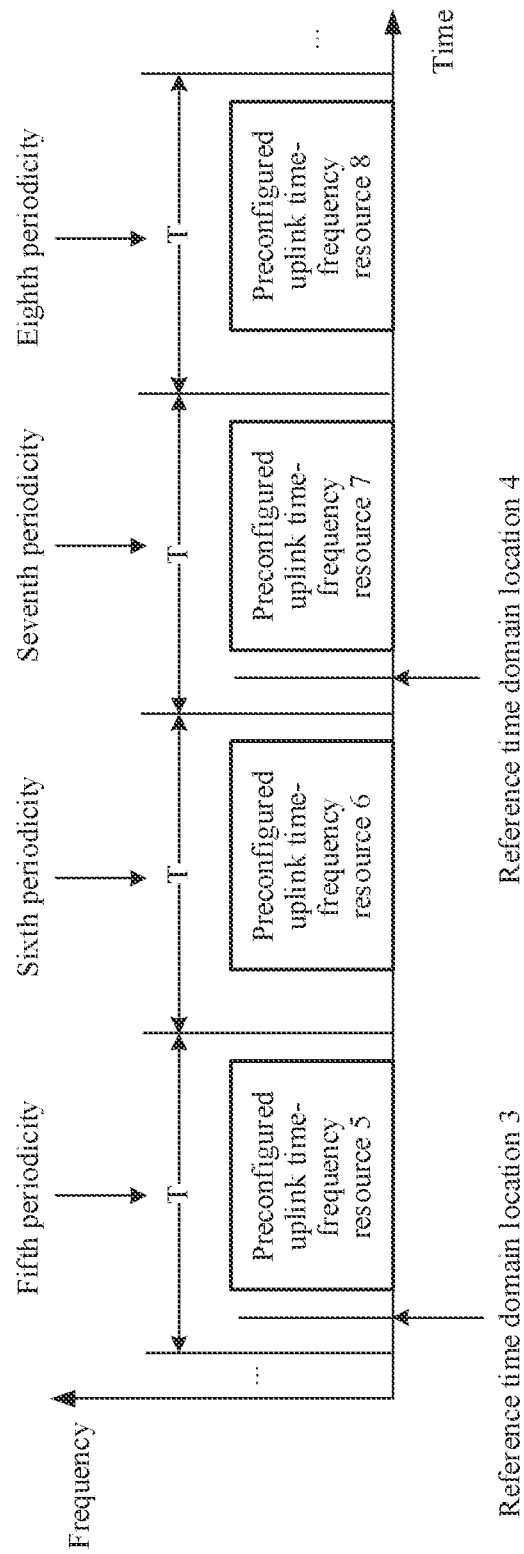
FIG. 11 is a schematic diagram 4 of a reference time domain location according to an embodiment of this application.

For example, it is assumed that N=2. To be specific, every two preconfigured uplink resources correspond to one reference time domain location. As shown in FIG. 11, it is assumed that a preconfigured uplink time-frequency resource 5 is in the fifth periodicity, a preconfigured uplink time-frequency resource 6 is in the sixth periodicity, a preconfigured uplink time-frequency resource 7 is in the seventh periodicity, and a preconfigured uplink time-frequency resource 8 is in the eighth periodicity. The preconfigured uplink time-frequency resource 5 and the preconfigured uplink time-frequency resource 6 may correspond to a reference time domain location 3, and the preconfigured uplink time-frequency resource 7 and the preconfigured uplink time-frequency resource 8 may correspond to a reference time domain location 4. That is, assuming that the preconfigured uplink time-frequency resource in step S501 is the preconfigured uplink time-frequency resource 8 shown in FIG. 11, a reference time domain location determined based on the preconfigured uplink time-frequency resource 8 should be the reference time domain location 4 shown in FIG. 11, namely, a time domain location before a start time domain location of the preconfigured uplink time-frequency resource 7 in the periodicity of the preconfigured uplink time-frequency resource 7. Alternatively, assuming that the preconfigured uplink time-frequency resource in step S501 is the preconfigured uplink time-frequency resource 5 shown in FIG. 11, a reference time domain location determined based on the preconfigured uplink time-frequency resource 5 should be the reference time domain location 3 shown in FIG. 11, namely, a time domain location before a start time domain location of the preconfigured uplink time-frequency resource 5 in the periodicity of the preconfigured uplink time-frequency resource 5.

It should be noted that, a reference time domain location shown in FIG. 11 is a location between a start time domain location of the first preconfigured uplink time-frequency resource in every N preconfigured uplink time-frequency resources and a start location of a periodicity of the first preconfigured uplink time-frequency resource in the periodicity of the first preconfigured uplink time-frequency resource. Certainly, the reference time domain location may alternatively be the start location of the periodicity of the first preconfigured uplink time-frequency resource in the every N preconfigured uplink time-frequency resources. Alternatively, the reference time domain location may be a start location of the first preconfigured uplink time-frequency resource in the every N preconfigured uplink time-frequency resources. Figures are not drawn one by one herein again.

Optionally, in this embodiment of this application, the start location of the periodicity of the preconfigured uplink time-frequency resource satisfies:

(Subframe number corresponding to the start location) mod (Periodicity of the preconfigured uplink time-frequency resource/First specified value)=0; or (Frame number corresponding to the start location) mod (Periodicity of the preconfigured uplink time-frequency resource/Second specified value)=0, where mod( ) represents modulo, and the first specified value or the second specified value is a positive number.

If calculation is performed by using the subframe number corresponding to the start location of the periodicity of the preconfigured uplink time-frequency resource, for example, if a unit of the periodicity of the preconfigured uplink time-frequency resource is millisecond (ms). the first specified value herein may be 1. Alternatively, for example, if a unit of the periodicity of the preconfigured uplink time-frequency resource is (10 ms), the first specified value herein may be 10.

Alternatively, if calculation is performed by using the frame number corresponding to the start location of the periodicity of the preconfigured uplink time-frequency resource, for example, if a unit of the periodicity of the preconfigured uplink time-frequency resource is ms, the second specified value herein may be 10. Alternatively, for example, if a unit of the periodicity of the preconfigured uplink time-frequency resource is 10 ms, the second specified value herein may be 1.

Figure 12:
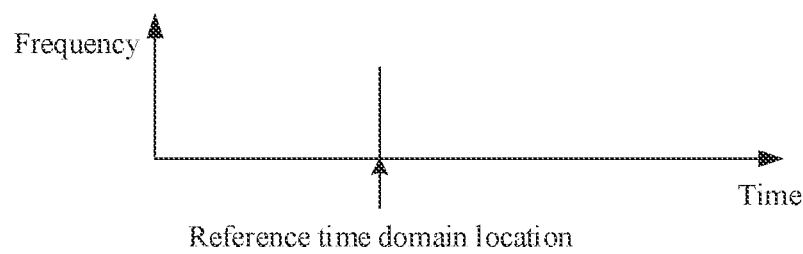
FIG. 12 is a schematic diagram 5 of a reference time domain location according to an embodiment of this application.

Optionally, in this embodiment of this application, the reference time domain location may alternatively have no relationship with the preconfigured uplink time-frequency resource. For example, as shown in FIG. 12, the reference time domain location may be an absolute time domain location. The absolute time domain location may be configured by the network device for the terminal device, or may be preconfigured on the terminal device in advance or specified in a protocol. This is not specifically limited in this embodiment of this application.

The first terminal device determines a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer.

In other words, in this embodiment of this application, if X=2, the first terminal device determines start time domain locations of the two gaps, where a distance between a start time domain location of the first gap and the reference time domain location is the first duration, and a distance between a start time domain location of the second gap and the reference time domain location is first duration×2+second duration. Certainly, if X is greater than 2, the same may be deduced.

For example, the first duration in this embodiment of this application is a positive integer multiple of 256 ms. For example, the first duration may be 256 ms.

For example, the second duration in this embodiment of this application is a positive integer multiple of 40 ms. For example, the second duration may be 40 ms.

S503. The first terminal device determines a time domain location that is (first duration×(M−1) second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1.

In other words, in this embodiment of this application, if X=2, and Y=X, the first terminal device determines start time domain locations of the two first durations, where a distance between a start time domain location of the first duration and the reference time domain location is 0, and a distance between a start time domain location of the 2nd first duration and the reference time domain location is first duration+second duration. Certainly, if X is greater than 2, the same may be deduced.

Figure 13:
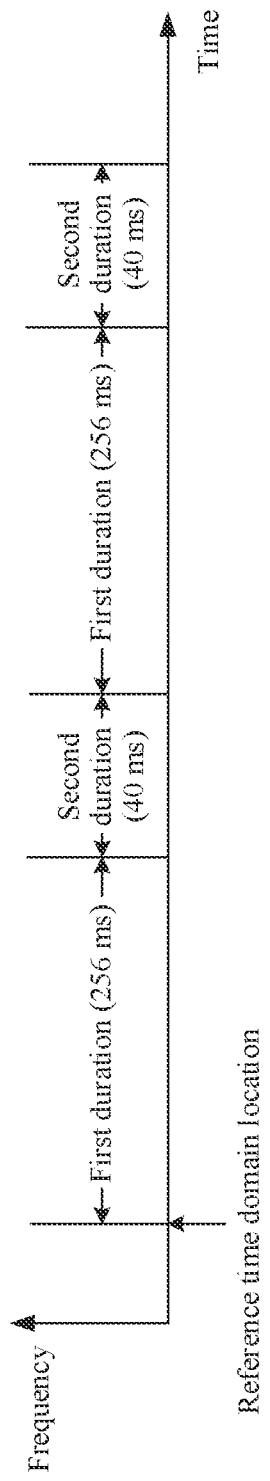
FIG. 13 is a distribution schematic diagram of first durations and second durations according to an embodiment of this application.

For example, assuming that the first duration is 256 ms, the second duration is 40 ms, X=2, and Y=X, a schematic diagram of locations of the two first durations and inserted locations of the two gaps may be shown in FIG. 13.

Alternatively, in this embodiment of this application, if X=2, and Y=X+1. the first terminal device determines start time domain locations of the three first durations, where a distance between a start time domain location of the 1st first duration and the reference time domain location is 0. a distance between a start time domain location of the 2nd first duration and the reference time domain location is first duration+second duration, and a distance between a start time domain location of the 3rd first duration and the reference time domain location is first duration+second duration)×2. Certainly, if X is greater than 2, the same may be deduced.

Figure 14:
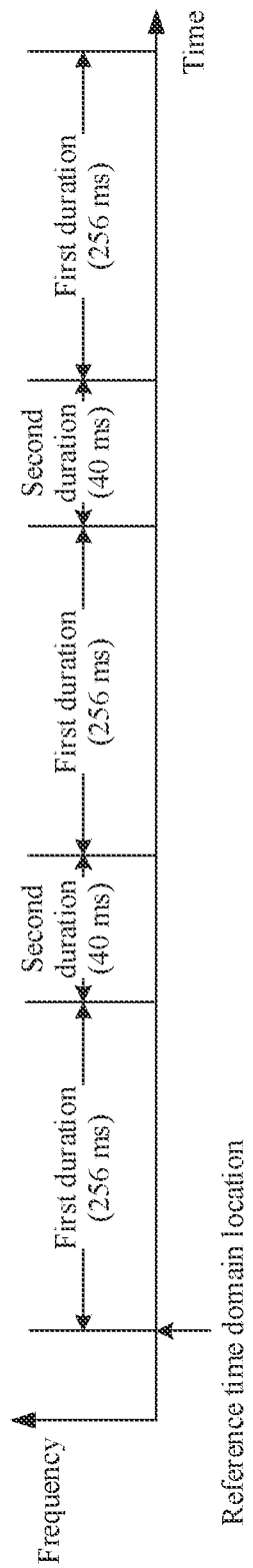
FIG. 14 is a distribution schematic diagram 2 of first durations and second durations according to an embodiment of this application.

For example, assuming that the first duration is 256 ms, the second duration is 40 ms, X=2, and Y=X+1. a schematic diagram of locations of the three first durations and inserted locations of the two gaps may be shown in FIG. 14.

Optionally, in this embodiment of this application, a start location of uplink data transmission may be the reference time domain location, or may be a location after the reference time domain location. For example, the start location of the uplink data transmission is an Sth first duration in the Y first durations, where S is a positive integer less than Y. This is not specifically limited in this embodiment of this application.

In addition, in this embodiment of this application, on the one hand, it is considered that the first terminal device may start transmitting the uplink data at the location after the reference time domain location. On the other hand, it is considered that a collision between the uplink data and a random access channel (for example, may be a physical random access channel (NPRACH)) may postpone the uplink data transmission. Therefore, all or a part of a time domain resource corresponding to at least one of the X first durations is a time domain resource in the first time-frequency resource used to transmit the uplink data.

Figure 15:
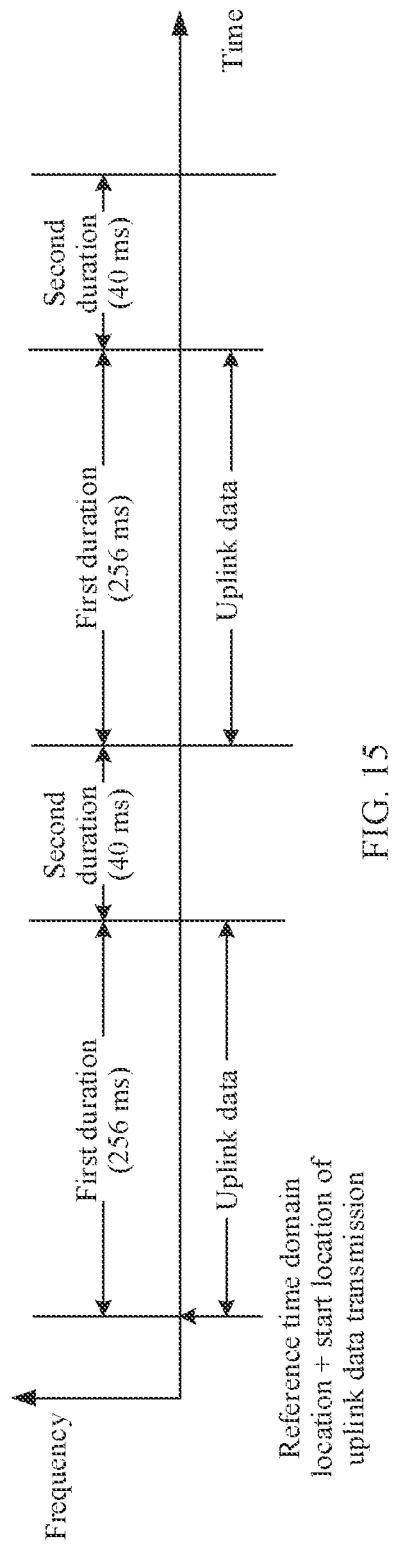
FIG. 15 is a schematic diagram 1 of data transmission according to an embodiment of this application.

For example, as shown in FIG. 15, assuming that a total duration of the uplink data transmission is 512 ms, and the uplink data transmission starts at the reference time domain location, the 1st 40 ms gap is inserted after the uplink data is transmitted in the 1st first duration for 256 ms. After one 40 ms gap, and after the uplink data is transmitted in the 2nd first duration for 256 ms, the data transmission may end. It can be learned that, in this example, X=2, Y=X, and all of a time domain resource corresponding to the two first durations is a time domain resource in the first time-frequency resource used to transmit the uplink data.

Figure 16:
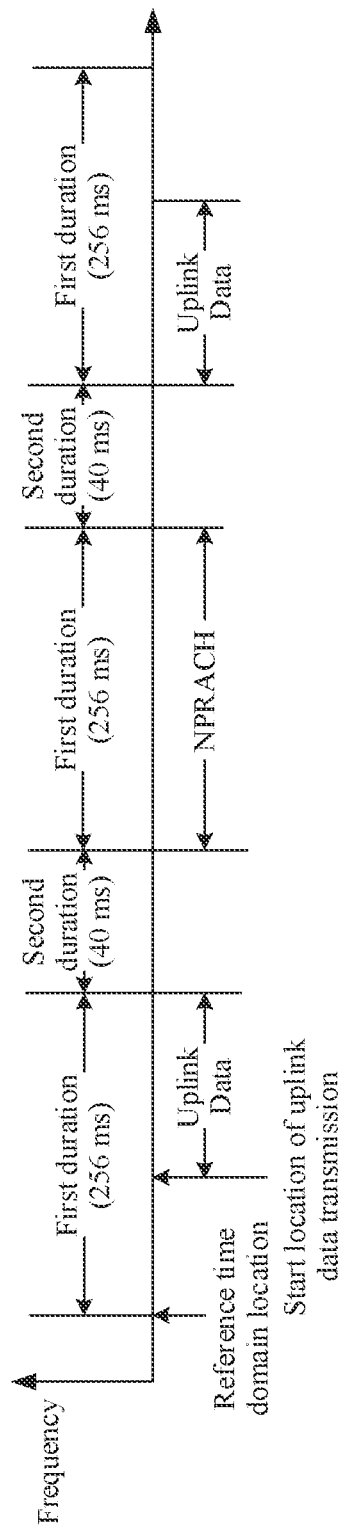
FIG. 16 is a schematic diagram 2 of data transmission according to an embodiment of this application.

Alternatively, for example, as shown in FIG. 16, assuming that a total duration of the uplink data transmission is 300 ms, and the uplink data transmission starts at the 100th ms after the reference time domain location, after the uplink data is transmitted in the 1st first duration for 256−100=156 ms, the first 40 ms gap is inserted. Assuming that at a location 256+40=296 ms away from the reference time domain location, the uplink data collides with an NPRACH, and the NPRACH needs to be transmitted for 256 ms, the 2nd first duration is used to transmit the NPRACH. After the 2nd first duration ends, the second 40 ms gap is inserted. After the second 40 ms gap ends, if the uplink data does not collide with another NPRACH at the start time domain location of the 3rd first duration, the 3rd first duration may be used to transmit the uplink data. Because the total duration of the uplink data transmission is 300 ms, and in the 1st first duration, the transmission is performed for 156 ms, after transmission of 300−156=144 ms in the 3rd first duration, the transmission may end. It can be learned that, in this example, X=2, Y=X+1, and a part of a time domain resource corresponding to the 1st first duration and the 3rd first duration in the three first durations is a time domain resource in the first time-frequency resource used to transmit the uplink data.

Figure 17:
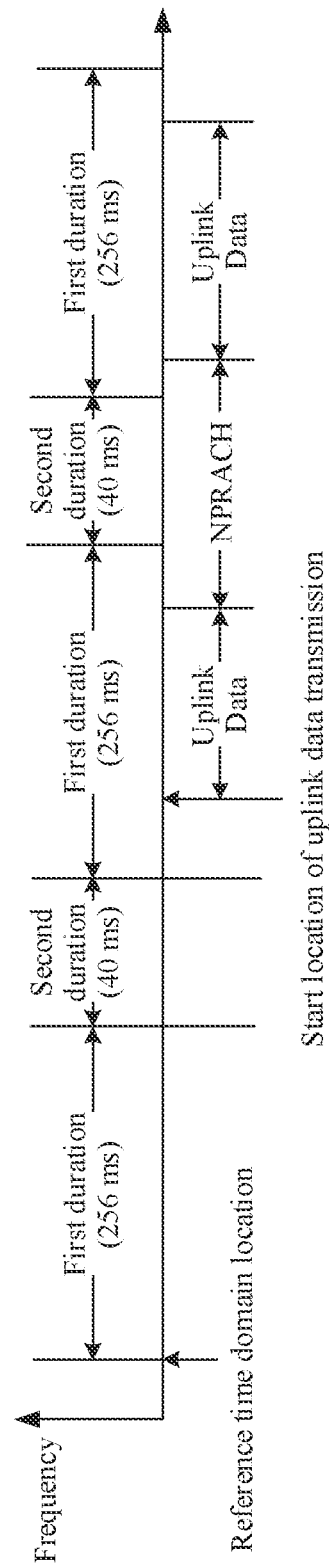
FIG. 17 is a schematic diagram 3 of data transmission according to an embodiment of this application.

Alternatively, for example, as shown in FIG. 17, it is assumed that a total duration of the uplink data transmission is 200 ms, and the uplink data transmission starts at a location (256+40+100) ms away from the reference time domain location, to be specific, the start location of the uplink data transmission is 100 ms away from a start location of the 2nd first duration. Assuming that 100 ms after the uplink data transmission starts the uplink data collides with an NPRACH, and the NPRACH needs to be transmitted for 156 ms, an end location of the NPRACH transmission is 60 ms away from a start location of the 3rd first duration. In this case, because the uplink data transmission has been performed in the 2nd first duration for 100 ms, the uplink data transmission may end after continuing for 100 ms. It can be learned that, in this example, X=2, Y=X+1, and a part of a time domain resource corresponding to the 2nd first duration and the 3rd first duration in the three first durations is a time domain resource in the first time-frequency resource used to transmit the uplink data.

It should be noted that in this embodiment of this application, when the preconfigured uplink time-frequency resource exists, the preconfigured uplink time-frequency resource may include the first time-frequency resource, or may not include the first time-frequency resource. This is not specifically limited herein.

Optionally, there is no necessary execution sequence between steps S502 and S503 in this embodiment of this application. Step S502 may be performed before step S503, or step S503 may be performed before step S502, or step S502 and step S503 may be simultaneously performed. This is not specifically limited in this embodiment of this application.

S504. The network device determines the reference time domain location based on the preconfigured uplink time-frequency resource.

S505. The network device determines the time domain location that is (first duration×N+second duration×(N−1)) away from the reference time domain location as the start time domain location of the X gaps, where N is 1, 2, 3, 4, . . . , X, none of the X gaps is used to send uplink data, and X is a positive integer.

S506. The network device determines the time domain location that is (first duration×(M−1)+second duration×(M−1)) away from the reference time domain location as the start time domain location of the Y first durations, where all or a part of a time domain resource corresponding to at least one of the Y first durations is a time domain resource in the first time-frequency resource used to transmit the uplink data, M is 1, 2, 3, 4, . . . , Y, and. Y=X or Y=X+1.

For related descriptions of steps S504 to S506, refer to the foregoing steps S501 to S503, and details are not described herein again.

Optionally, there is no necessary execution sequence between steps S505 and S506 in this embodiment of this application. Step S505 may be performed before step S506, or step S506 may be performed before step S505, or step S505 and step S506 may be simultaneously performed. This is not specifically limited in this embodiment of this application.

Optionally, there is no necessary execution sequence between steps S501 to S503 and S504 to S506 in this embodiment of this application. Steps S501 to S503 may be performed before steps S504 to S506, or steps S504 to S506 may be performed before steps S501 to S503, or steps S501 to S503 and steps S504 to S506 may be simultaneously performed. This is not specifically limited in this embodiment of this application.

S507. The first terminal device sends the uplink data to the network device on the first time-frequency resource. The network device receives the uplink data from the first terminal device on the first time-frequency resource.

Certainly, in this embodiment of this application, when sending the uplink data to the network device on the first time-frequency resource, the first terminal device needs to send, to the network device on the first time-frequency resource, a reference signal (for example, a DMRS) used to demodulate the uplink data. For details, refer to an existing implementation. Details are not described herein.

Based on the communication method according to this embodiment of this application, a plurality of terminal devices that are in a same cell and that can transmit uplink data on a same uplink time-frequency resource correspond to a same reference time domain location, and a time domain location that is (first duration×N+second duration×(N−1)) away from the reference time domain location is a start time domain location of X gaps. Therefore, for the plurality of terminal devices that are in the same cell and that can transmit the uplink data on the same uplink time-frequency resource, even if the plurality of terminal devices send the uplink data at different start locations, that start locations and end locations of inserted gaps of a second duration are aligned may still be ensured. Further, if respective reference signals of the plurality of terminal devices are orthogonal before the gaps of the second duration are inserted, that respective reference signals of the plurality of terminal devices are orthogonal after the gaps of the second duration are inserted may also be ensured.

Figure 18:
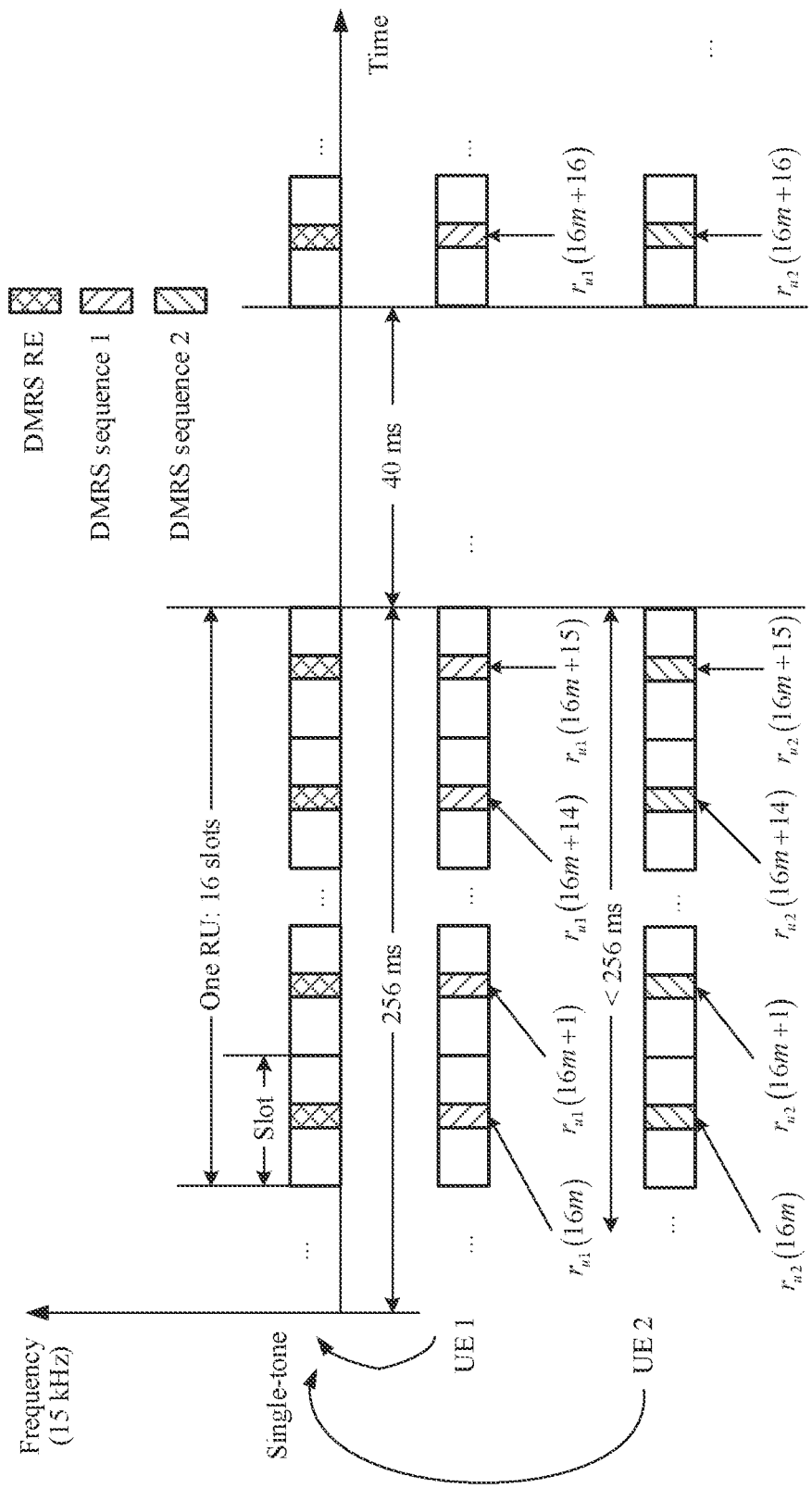
FIG. 18 is a schematic diagram of data transmission of different terminal devices according to an embodiment of this application.

For example, an example in which a subcarrier spacing of a shared resource is 15 kHz and one RU=8 ms is used. As shown in FIG. 18, it is assumed that when UE 1 and UE 2 in a same cell transmit uplink data on the shared resource, a start location at which the UE 1 sends uplink data is different from a start location at which the UE 2 sends uplink data. Before the UE 1 inserts a 40 ms (corresponding to five RUs) gap, Hadamard sequences corresponding to the UE 1 and the UE 2 are orthogonal. Gold sequences corresponding to UE 1 and UE 2 are the same. Therefore, a DMRS corresponding to the UE 1 and a DMRS corresponding to the UE 2 are orthogonal. At a location where the UE 1 inserts the 40 ms gap, the UE 2 also inserts the 40 ms gap although a transmission duration of the UE 2 is less than 256 ms. In this way, in the first slot after the 40 ms gap ends, a value of n in the formula (1) and formula (2) for generating the DMRS corresponding to the UE 1 is 16m+16. A value of n in the formula (1) and formula (2) for generating DMRS corresponding to the UE 2 is 16m+16. It can be learned from the descriptions of the Hadamard sequence and the Gold sequence that, in this case, RU boundaries are aligned. On a same time-frequency resource, a Hadamard sequence corresponding to the UE 1 and a Hadamard sequence corresponding to the UE 2 are still orthogonal, and a Gold sequence corresponding to the UE 1 and a Gold sequence corresponding to the UE 2 are the same. Therefore, that after the UE 1 inserts the 40 ms gap, a DMRS corresponding to the UE 1 and a DMRS corresponding to the UE 2 are orthogonal can be ensured.

It should be noted that, if the start location at which the UE 1 sends the uplink data in the foregoing example is not the reference time domain location, a transmission duration of the UE 1 is also less than 256 ms at a start location of the first inserted 40 ms gap. That is, a start time domain location of the first 40 ms gap is 256 ms away from the reference time domain location, and does not depend on whether the transmission duration of the UE 1 or the transmission duration of the UE 2 is 256 ms or not.

The processor 301 in the network device 30 shown in FIG. 3 may invoke application program code stored in the memory 302, to indicate the network device to perform the actions performed by the network device in steps S501 to S507. The processor 401 in the terminal device 40 shown in FIG. 3 may invoke the application program code stored in the memory 402, to indicate the network device to perform the actions performed by the terminal device in steps S501 to S507. This is not limited in this embodiment.

It may be understood that, in the foregoing embodiments, methods and/or steps implemented by the first terminal device may also be implemented by a component (for example, a chip or a circuit) that can be used in the first terminal device, and methods and/or steps implemented by the network device may also be implemented by a component that can be used in the network device.

The foregoing mainly describes the solutions according to the embodiments of this application from a perspective of interaction between network elements. Correspondingly, an embodiment of this application further provides a communication apparatus, and the communication apparatus is configured to implement the foregoing methods. The communication apparatus may be the first terminal device in the foregoing method embodiments, or an apparatus including the foregoing first terminal device, or a component that can be used in the first terminal device. Alternatively, the communication apparatus may be the network device in the foregoing method embodiments, or an apparatus including the foregoing network device, or a component that can be used in the network device. It may be understood that, to implement the foregoing function, the communication apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiment. For example, each function module may be obtained through division based on each corresponding function, or two or more functions may be integrated into one processing module. The foregoing integrated module may be implemented in a form of hardware, or may be implemented in a form of a software function module. It should be noted that in the embodiments of this application, division into the modules is an example and is merely logical function division, and may be other division during actual implementations.

Figure 19:
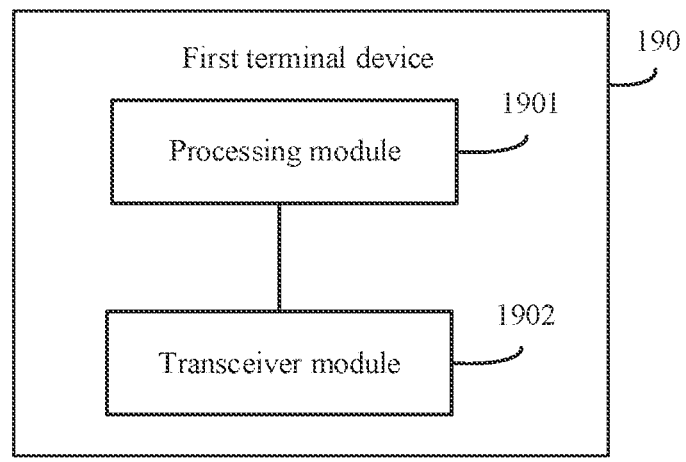
FIG. 19 is a schematic structural diagram of a first terminal device according to an embodiment of this application.

For example, the communication apparatus is the first terminal device in the foregoing method embodiments. FIG. 19 is a schematic structural diagram of a first terminal device 190. The first terminal device 190 includes a processing module 1901 and a transceiver module 1902. The transceiver module 1902 may also be referred to as a transceiver unit, and is configured to implement a sending and/or receiving function, for example, may be a transceiver circuit, a transceiver, a transceiver, or a communication interface.

The processing module 1901 is configured to determine a reference time domain location based on a preconfigured uplink time-frequency resource, where the reference time domain location is the same as a reference time domain location determined by another terminal device in a plurality of terminal devices that are in the first cell and that can transmit uplink data on a same time-frequency resource. The processing module 1901 is further configured to determine a time domain location that is (first duration×N+second duration×(N−1)) away from the reference time domain location as a start time domain location of X gaps, where N is 1, 2, 3, 4, . . . , X, none of the X gaps is used to send uplink data, and X is a positive integer. The processing module 1901 is further configured to determine a time domain location that is (first duration×(M−1)+second duration×(M−1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1. The transceiver module 1902 is configured to send uplink data to a network device on the first time-frequency resource.

Optionally, that the processing module 1901 is configured to determine a reference time domain location based on a preconfigured uplink time-frequency resource includes: being configured to receive first indication information from the network device, where the first indication information is used to indicate a first offset duration of the reference time domain location relative to a start location of a periodicity of the preconfigured uplink time-frequency resource; and being configured to determine the reference time domain location based on the first indication information and the start location of the periodicity of the preconfigured uplink time-frequency resource.

Alternatively, optionally, that the processing module 1901 is configured to determine a reference time domain location based on a preconfigured uplink time-frequency resource includes: being configured to receive second indication information from the network device, where the second indication information is used to indicate a second offset duration of a start time domain location of the preconfigured uplink time-frequency resource relative to the reference time domain location and determining the reference time domain location based on the second indication information and the start time domain location of the preconfigured uplink time-frequency resource.

All content related to the steps in the foregoing method embodiments may be cited in function descriptions of corresponding functional modules. Details are not described herein again.

In this embodiment, the first terminal device 190 is presented in a form of functional modules obtained through division in an integrated manner. The "module" herein may be a specific ASIC, a circuit, a processor and a memory for executing one or more software or firmware programs, an integrated logic circuit, and/or other components that can provide the foregoing functions. In a simple embodiment, a person skilled in the art may figure out that the first terminal device 190 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the communication methods in the foregoing method embodiments.

Specifically, the processor 401 in the terminal device 40 shown in FIG. 3 may invoke the computer-executable instructions stored in the memory 402, to implement functions/implementation processes of the processing module 1901 and the transceiver module 1902 in FIG. 19. Alternatively, the processor 401 in the terminal device 40 shown in FIG. 3 may invoke the computer-executable instructions stored in the memory 402, to implement functions/implementation processes of the processing module 1901 in FIG. 19, and the transceiver 403 in the terminal device 40 shown in FIG. 3 may implement functions/implementation processes of the transceiver module 1902 in FIG. 19.

The first terminal device 190 according to this embodiment can perform the foregoing communication methods. Therefore, for a technical effect that can be achieved by the first terminal device 190, refer to the foregoing method embodiments. Details are not described herein again.

Figure 20:
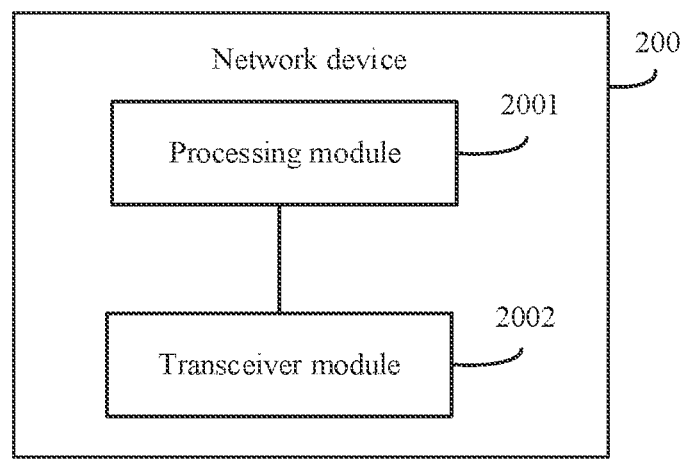
FIG. 20 is a schematic structural diagram of a network device according to an embodiment of this application.

Alternatively, for example, the communication apparatus is the network device in the foregoing method embodiments. FIG. 20 is a schematic structural diagram of a network device 200. The network device 200 includes a processing module 2001 and a transceiver module 2002. The transceiver module 2002 may also be referred to as a transceiver unit, and is configured to implement a sending and/or receiving function, for example, may be a transceiver circuit, a transceiver, a transceiver, or a communication interface.

The processing module 2001 is configured to determine a reference time domain location based on a preconfigured uplink time-frequency resource, where the reference time domain location corresponds to a plurality of terminal devices that are in the first cell and that can transmit uplink data on a same time-frequency resource. The processing module 2001 is further configured to determine a time domain location that is (first duration×N+second duration× (N−1)) away from the reference time domain location as a start time domain location of X gaps, where N is 1, 2, 3, 4, . . . , X, none of the X gaps is used to send uplink data, and X is a positive integer. The processing module 2001 is further configured to determine a time domain location that is (first duration×(M−1)+second duration×(M 1)) away from the reference time domain location as a start time domain location of Y first durations, where all or a part of a time domain resource corresponding to at least one of the Y first durations is a time domain resource in a first time-frequency resource used to transmit the uplink data, M is 1, 2, 3, 4, . . . , Y, and Y=X or Y=X+1. The transceiver module 2002 is configured to receive uplink data from the first terminal device on the first time-frequency resource.

Optionally, that the processing module 2001 is configured to determine a reference time domain location based on a preconfigured uplink time-frequency resource includes: being configured to determine a first offset duration of the reference time domain location relative to a start location of a periodicity of the preconfigured uplink time-frequency resource; and being configured to determine the reference time domain location based on the first offset duration and the start location of the periodicity of the preconfigured uplink time-frequency resource.

Alternatively, optionally, that the processing module 2001 is configured to determine a reference time domain location based on a preconfigured uplink time-frequency resource includes: being configured to determine a second offset duration of a start time domain location of the preconfigured uplink time-frequency resource relative to the reference time domain location; and determining the reference time domain location based on the second offset duration and the start time domain location of the preconfigured uplink time-frequency resource.

Optionally, the transceiver module 2002 is further configured to send first indication information to the first terminal device. The first indication information is used to indicate the first offset duration of the reference time domain location relative to the start location of the periodicity of the preconfigured uplink time-frequency resource.

Alternatively, optionally, the transceiver module 2002 is further configured to send second indication information to the first terminal device. The second indication information is used to indicate the second offset duration of the start time domain location of the preconfigured uplink time-frequency resource relative to the reference time domain location.

All content related to the steps in the foregoing method embodiments may be cited in function descriptions of corresponding functional modules. Details are not described herein again.

In this embodiment, the network device 200 is presented in a firm of functional modules obtained through division in an integrated manner. The "module" herein may be a specific ASIC, a circuit, a processor and a memory for executing one or more software or firmware programs, an integrated logic circuit, and/or other components that can provide the foregoing functions. In a simple embodiment, a person skilled in the art may figure out that the network device 200 may be in a form of the network device 30 shown in FIG. 3.

For example, the processor 301 in the network device 30 shown in FIG. 3 may invoke computer-executable instructions stored in the memory 302, to enable the network device 30 to perform the communication methods in the foregoing method embodiments.

Specifically, the processor 301 in the network device 30 shown in FIG. 3 may invoke the computer-executable instructions stored in the memory 302, to implement functions/implementation processes of the processing module 2001 and the transceiver module 2002 in FIG. 20. Alternatively, the processor 301 in the network device 30 shown in FIG. 3 may invoke the computer-executable instructions stored in the memory 302, to implement functions/implementation processes of the processing module 2001 in FIG. 20, and the transceiver 303 in the network device 30 shown in FIG. 3 may implement function/implementation processes of the transceiver module 2002 in FIG. 20.

The network device 200 according to this embodiment can perform the foregoing communication methods. Therefore, for a technical effect that can be achieved by the network device 200, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory to instruct the communication apparatus to perform the method in any one of the foregoing method embodiments. Certainly, the memory may alternatively not be in the communication apparatus. When the communication apparatus is a chip system, the communication apparatus may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the apparatuses described above.

Although this application is described with reference to the embodiments, in a process of implementing this application that claims protection, persons skilled in the art may understand and implement another variation of the disclosed embodiments by viewing the accompanying drawings, disclosed content, and the claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, wherein the method is applicable to a wireless communication system, the wireless communication system comprises a first cell, the first cell comprises a plurality of terminal devices that can transmit uplink data on a same uplink time-frequency resource, the plurality of terminal devices comprise a first terminal device, and the method comprises:

determining, by the first terminal device, a reference time domain location based on a preconfigured uplink time-frequency resource, wherein the reference time domain location is the same as a reference time domain location determined by another terminal device in the plurality of terminal devices, wherein the reference time domain location is a time domain location before a start time domain location of the preconfigured uplink time-frequency resource in a periodicity of the preconfigured uplink time-frequency resource;

determining, by the first terminal device, a time domain location that is (first duration×N+second duration×(N−1)) away from the reference time domain location as a start time domain location of X gaps, wherein N is 1, 2, 3, 4, . . . , X, wherein none of the X gaps is used to send uplink data, and X is a positive integer;

determining, by the first terminal device, a time domain location that is (first duration×(M−1)+second duration× (M−1)) away from the reference time domain location as a start time domain location of Y first durations, wherein all or a part of a time domain resource corresponding to at least one of the Y first durations is a time domain resource in a first time-frequency resource used to transmit the uplink data, M is 1, 2, 3, 4, . . . , Y, and Y=X or Y=X+1; and sending, by the first terminal device, uplink data to a network device on the first time-frequency resource.

2. The method according to claim 1, wherein the reference time domain location is a start location of the periodicity of the preconfigured uplink time-frequency resource.

3. The method according to claim 2, wherein the start location of the periodicity of the preconfigured uplink time-frequency resource satisfies:
(subframe number corresponding to the start location) mod (periodicity of the preconfigured uplink time-frequency resource/first specified value)=0; or
(frame number corresponding to the start location) mod (periodicity of the preconfigured uplink time-frequency resource/second specified value)=0, wherein mod( )represents modulo, and the first specified value or the second specified value is a positive number.

4. The method according to claim 2, wherein the determining, by the first terminal device, a reference time domain location based on a preconfigured uplink time-frequency resource comprises:
receiving, by the first terminal device, first indication information from the network device, wherein the first indication information is used to indicate a first offset duration of the reference time domain location relative to the start location of the periodicity of the preconfigured uplink time-frequency resource; and
determining, by the first terminal device, the reference time domain location based on the first indication information and the start location of the periodicity of the preconfigured uplink time-frequency resource.

5. The method according to claim 1, wherein the determining, by the first terminal device, a reference time domain location based on a preconfigured uplink time-frequency resource comprises:
receiving, by the first terminal device, second indication information from the network device, wherein the second indication information is used to indicate a second offset duration of the start time domain location of the preconfigured uplink time-frequency resource relative to the reference time domain location; and
determining, by the first terminal device, the reference time domain location based on the second indication information and the start time domain location of the preconfigured uplink time-frequency resource.

6. A communication method, wherein the method is applicable to a wireless communication system, the wireless communication system comprises a first cell, the first cell comprises a plurality of terminal devices that can transmit uplink data on a same uplink time-frequency resource, the plurality of terminal devices comprise a first terminal device, and the method comprises:
determining, by a network device, a reference time domain location based on a preconfigured uplink time-frequency resource, wherein the reference time domain location corresponds to the plurality of terminal devices, wherein the reference time domain location is a time domain location before a start time domain location of the preconfigured uplink time-frequency resource in a periodicity of the preconfigured uplink time-frequency resource;
determining, by the network device, a time domain location that is (first duration×N+second duration×(N−1)) away from the reference time domain location as a start time domain location of X gaps, wherein N is 1, 2, 3, 4, . . . , X, wherein none of the X gaps is used to send uplink data, and X is a positive integer;
determining, by the network device, a time domain location that is (first duration×(M−1) +second duration× (M−1)) away from the reference time domain location as a start time domain location of Y first durations, wherein all or a part of a time domain resource corresponding to at least one of the Y first durations is a time domain resource in a first time-frequency resource used to transmit the uplink data, M is 1, 2, 3, 4, ..., Y, and Y=X or Y=X+1; and
receiving, by the network device, uplink data from the first terminal device on the first time-frequency resource.

7. The method according to claim 6, wherein the reference time domain location is a start location of the periodicity of the preconfigured uplink time-frequency resource.

8. The method according to claim 7, wherein the start location of the periodicity of the preconfigured uplink time-frequency resource satisfies:
(subframe number corresponding to the start location) mod (periodicity of the preconfigured uplink time-frequency resource/first specified value)=0; or
(frame number corresponding to the start location) mod (periodicity of the preconfigured uplink time-frequency resource/second specified value)=0, wherein mod( )represents modulo, and the first specified value or the second specified value is a positive number.

9. The method according to claim 7, wherein the determining, by a network device, a reference time domain location based on a preconfigured uplink time-frequency resource comprises:
determining, by the network device, a first offset duration of the reference time domain location relative to the start location of the periodicity of the preconfigured uplink time-frequency resource; and
determining, by the network device, the reference time domain location based on the first offset duration and the start location of the periodicity of the preconfigured uplink time-frequency resource.

10. The method according to claim 6, wherein the determining, by a network device, a reference time domain location based on a preconfigured uplink time-frequency resource comprises:
determining, by the network device, a second offset duration of the start time domain location of the preconfigured uplink time-frequency resource relative to the reference time domain location; and
determining, by the network device, the reference time domain location based on the second offset duration and the start time domain location of the preconfigured uplink time-frequency resource.

11. A first terminal device, wherein the first terminal device is applicable to a wireless communication system, the wireless communication system comprises a first cell, the first cell comprises a plurality of terminal devices that can transmit uplink data on a same uplink time-frequency resource, and the plurality of terminal devices comprise the first terminal device, wherein the first terminal device comprises a transceiver, at least one processor and one or more memories coupled to the at least one processor, and wherein:
the one or more memories store programming instructions for execution by the at least one processor to:
determine a reference time domain location based on a preconfigured uplink time-frequency resource, wherein the reference time domain location is the same as a reference time domain location determined by another terminal device in the plurality of terminal devices, wherein the reference time domain location is a time domain location before a start time domain location of the preconfigured uplink time-frequency resource in a periodicity of the preconfigured uplink time-frequency resource;
determine a time domain location that is (first duration× N+second duration×(N−1)) away from the reference time domain location as a start time domain location of X gaps, wherein N is 1, 2, 3, 4, ..., X, wherein none of the X gaps is used to send uplink data, and X is a positive integer; and determine a time domain location that is (first duration×(M−1)+second duration×(M−1)) away from the reference time domain location as a start time domain location of Y first durations, wherein all or a part of a time domain resource corresponding to at least one of the Y first durations is a time domain resource in a first time-frequency resource used to transmit the uplink data, M is 1, 2, 3, 4, . . . , Y, and Y=X or Y=X+1; and the transceiver is configured to send uplink data to a network device on the first time-frequency resource.

12. The first terminal device according to claim 11, wherein the reference time domain location is a start location of the periodicity of the preconfigured uplink time-frequency resource.

13. The first terminal device according to claim 12, wherein the start location of the periodicity of the preconfigured uplink time-frequency resource satisfies:

(subframe number corresponding to the start location) mod (periodicity of the preconfigured uplink time-frequency resource/first specified value)=0; or (frame number corresponding to the start location) mod (periodicity of the preconfigured uplink time-frequency resource/second specified value)=0, wherein mod( )represents modulo, and the first specified value or the second specified value is a positive number.

14. The first terminal device according to claim 12, wherein the determining a reference time domain location based on a preconfigured uplink time-frequency resource comprises:

receiving first indication information from the network device, wherein the first indication information is used to indicate a first offset duration of the reference time domain location relative to the start location of the periodicity of the preconfigured uplink time-frequency resource; and determining the reference time domain location based on the first indication information and the start location of the periodicity of the preconfigured uplink time-frequency resource.

\* \* \* \* \*

UNITED STATES PATENT AND TRADEMARK OFFICE
CERTIFICATE OF CORRECTION

| | | |
|---|---|---|
| PATENT NO. | : 12,035,341 B2 | Page 1 of 1 |
| APPLICATION NO. | : 17/391622 | |
| DATED | : July 9, 2024 | |
| INVENTOR(S) | : Yuwan Su et al. | |

It is certified that error appears in the above-identified patent and that said Letters Patent is hereby corrected as shown below:

On the Title Page

In Column 2 item (57) (Abstract), In Line 12, Delete "H+" and insert -- + --.

In the Claims

In Column 33, In Line 6, In Claim 3, delete "–0;" and insert -- =0; --.

In Column 33, In Line 63, In Claim 6, delete ") +second" and insert -- )+second --.

Signed and Sealed this
Fifth Day of November, 2024

*Katherine Kelly Vidal*
Katherine Kelly Vidal
*Director of the United States Patent and Trademark Office*